(12) United States Patent
Serizawa et al.

(10) Patent No.: US 8,039,168 B2
(45) Date of Patent: Oct. 18, 2011

(54) SEPARATOR FOR FLAT-TYPE POLYMER ELECTROLYTE FUEL CELLS

(75) Inventors: Tooru Serizawa, Tokyo (JP); Yasuhiro Uchida, Tokyo (JP); Takanori Maeda, Tokyo (JP); Hiroshi Yagi, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1446 days.

(21) Appl. No.: 10/584,902

(22) PCT Filed: Oct. 4, 2005

(86) PCT No.: PCT/JP2005/018715
§ 371 (c)(1),
(2), (4) Date: Jun. 28, 2006

(87) PCT Pub. No.: WO2006/038701
PCT Pub. Date: Apr. 13, 2006

(65) Prior Publication Data
US 2009/0155663 A1 Jun. 18, 2009

(30) Foreign Application Priority Data

Oct. 5, 2004 (JP) ................. 2004-292267
Oct. 5, 2004 (JP) ................. 2004-292268
Oct. 5, 2004 (JP) ................. 2004-292269

(51) Int. Cl.
*H01M 2/08* (2006.01)
*H01M 2/14* (2006.01)
*H01M 8/00* (2006.01)
*H01M 2/38* (2006.01)

(52) U.S. Cl. .................. 429/507; 429/400; 429/457

(58) Field of Classification Search .................. None
See application file for complete search history.

(56) References Cited

U.S. PATENT DOCUMENTS 7,316,856 B2 * 1/2008 Maeda et al. ................. 429/456
(Continued)

FOREIGN PATENT DOCUMENTS

| JP | 2003-115312 | 4/2003 |
| JP | 2005-100880 | 4/2005 |
| JP | 2005-222877 | 8/2005 |

(Continued)

OTHER PUBLICATIONS

U.S. Appl. No. 11/695,196, filed Apr. 2, 2007, Uchida, et al.

(Continued)

*Primary Examiner* — Barbara Gilliam
*Assistant Examiner* — Adam A Arciero
(74) *Attorney, Agent, or Firm* — Oblon, Spivak, McClelland, Maier & Neustadt, L.L.P.

(57) ABSTRACT

A separator for flat-type polymer electrolyte fuel cells comprises a fuel-feed-side separator and an oxygen-feed-side separator, each comprising a collector portion in which n unit conductive substrates (n is an integer of 2 or more), each having a plurality of through-holes, are arrayed in flat configuration via gaps, and a pair of insulating frames which have n openings in alignment with an array position of the unit conductive substrates and are integrated in such a way as to hold the collector portion between them. The back-to-back (n−1) unit conductive substrates of the n unit conductive substrates in one of both separators, as counted from the end of its array direction, and the $2^{nd}$ to $n^{th}$ unit conductive substrates of the n unit conductive substrates in another separator, as counted from the end of its array direction are successively joined together by means of (n−1) connecting hinges.

4 Claims, 20 Drawing Sheets

U.S. PATENT DOCUMENTS

2002/0146610 A1* 10/2002 Hayashi et al. ................. 429/30

FOREIGN PATENT DOCUMENTS

WO 03/096455 11/2003
WO 03/098726 11/2003

OTHER PUBLICATIONS

U.S. Appl. No. 11/697,454, filed Apr. 6, 2007, Yagi, et al.
U.S. Appl. No. 11/948,212, filed Nov. 30, 2007, Maeda, et al.
U.S. Appl. No. 11/793,595, filed Jun. 21, 2007, Yagi, et al.

* cited by examiner

SEPARATOR FOR FLAT-TYPE POLYMER ELECTROLYTE FUEL CELLS

TECHNICAL FIELD

The present invention relates generally to a separator for fuel cells, and more particularly to a separator for flat-type polymer electrolyte fuel cells.

BACKGROUND ART

Briefly, a fuel cell is a device wherein fuel (a reducing agent) and oxygen or air (an oxidizing agent) are continuously supplied to it from outside for electro-chemical reactions through which electric energy is taken out, and classified depending on its working temperature, the type of the fuel used, its applications, etc. Recently developed fuel cells are generally broken down into five types: a solid oxide type fuel cell, a molten carbonate type fuel cell, a phosphoric acid type fuel cell, a polymer electrolyte type fuel cell, and an alkaline aqueous solution type fuel cell, depending on kinds of using electrolytes.

These fuel cells use hydrogen gas resulting from methane or the like as fuel. More recently, a direct methanol type fuel cell (sometimes abbreviated as DMFC) relying on direct use as fuel of a methanol aqueous solution has been known in the art, too.

Among them, attention has now been directed to a solid polymer type fuel cell (hereinafter abbreviated as PEFC) having a structure wherein a solid polymer membrane is held between two kinds of electrodes and these components are further sandwiched between separators.

In general, this PEFC has a stacking structure wherein a plurality of unit cells, each having electrodes, are stacked on each side of the solid polymer membrane in such a way as to increase its electromotive force depending on what it is used for. A separator interposed between the unit cells is generally provided on its one side with a fuel gas feed groove for feeding fuel to one of the adjoining unit cells. With such a separator, fuel gas and oxidant gas are fed along its surfaces.

Known for the PEFC separator here are a graphite plate separator with a groove cut or otherwise formed in it, a separator obtained by molding of a carbon compound with carbon kneaded into a resin, a metal separator with a groove etched or otherwise formed in it, a metallic material separator with its surface portion covered up with a corrosion-resistant resin, and so on. If required, these separators are each provided with a fuel gas feed groove and/or an oxidant gas feed groove.

Besides such fuel cells of the stacking structure, for instance, there is a fuel cell for personal digital assistants, which requires not that large electromotive force, but must be of as thin a flat-type as possible. With that flat-type wherein a plurality of unit cells are arrayed in flat configuration and electrically connected together in series, however, there is a problem that the feed of fuel and oxygen becomes uneven from site to site.

As one possible approach to solving such uneven fuel feed problem, there has now been proposed a separator having a structure wherein a number of vertical through-holes are formed in a separator plane contiguous to a membrane-electrode assembly (MEA) to supply fuel and oxygen through them (JP(A)2003-203647).

In the present disclosure, the term "membrane-electrode assembly or MEA" is understood to refer to an assembly including electrode portions positioned between the fuel-feed-side separator and the oxygen-feed-side separator of a fuel cell, specifically, an assembly like a membrane wherein a collector layer, a fuel electrode, a polymer electrolyte, an oxygen electrode and a collector layer are stacked together in this order.

With that separator of such structure as explained above, however, there are problems such as difficulty with which wires are formed for making series connections between unit cells, complicated processes, and increased contact resistance due to wire connections.

With a prior art flat-type PEFC with the MEA put between the fuel-feed-side separator and the oxygen-feed-side separator as discussed above, there is another problem that as the MEA swells during power generation, it causes contact of the MEA with the fuel-feed-side separator or the oxygen-feed-side separator to become insufficient, resulting in an increased contact resistance. This problem could possibly be eliminated by using bolts to tighten together the fuel-feed-side separator and the oxygen-feed-side separator positioned on both sides of the MEA, thereby ensuring contact of the respective layers. However, provision of the width necessary for such tightening between the unit cells arrayed in flat configuration would arise yet another problem that the effective area of each unit cell diminishes.

DISCLOSURE OF THE INVENTION

A primary object of the invention is to provide a separator that is of reduced weight, and enables electrical series connections to be easily made between unit cells without increasing the internal resistance of a cell due to contact resistance.

According to one aspect of the invention, such an object is achievable by the provision of a separator for a flat-type polymer electrolyte fuel cell comprising unit cells arrayed in flat configuration, characterized by comprising a fuel-feed-side separator and an oxygen-feed-side separator, each comprising a collector portion in which n unit conductive substrates wherein n is an integer of 2 or more, each having a plurality of through-holes through which fuel or oxygen passes, are arrayed in flat configuration via gaps, and a pair of insulating frames which have n openings in alignment with an array position of said unit conductive substrates and are integrated in such a way as to hold said collector portion therebetween, wherein:

$1^{st}$ to $(n-1)^{th}$ unit conductive substrates of the n unit conductive substrates that form said collector portion in one of said fuel-feed-side separator and said oxygen-feed-side separator, as counted from one end of an array direction thereof, and $2^{nd}$ to $n^{th}$ unit conductive substrates of the n unit conductive substrates that form said collector portion in another separator, as counted from one end of an array direction thereof are successively joined together by means of (n−1) connecting hinges.

According to one embodiment of the above separator, in one of said fuel-feed-side separator and said oxygen-feed-side separator, the $1^{st}$ to $(n-1)^{th}$ unit conductive substrates of the n unit conductive substrates that form said collector portion, as counted from one end of the array direction, each includes at a corner a lug member that juts toward an adjoining unit conductive substrate; the $2^{nd}$ to $n^{th}$ unit conductive substrates as counted from said one end of the array direction each includes at a corner a cutout that is in alignment with said lug member of a unit conductive substrate adjacent to an upstream side of the array direction and configured in such a way as to from a gap with said lug member; the (n−1) unit conductive substrates having said lug members each includes at said lug member a connecting hinge that juts in a direction substantially orthogonal to the array direction of the unit conductive substrates; and the $2^{nd}$ to $n^{th}$ unit conductive substrates of the n unit conductive substrates that form said collector portion in another separator, as counted from one end of the array direction thereof, are joined to said lug members by means of the (n−1) connecting hinges.

According to another embodiment of the above separator, in the n unit conductive substrates that form the collector portion in the fuel-feed-side separator and the n unit conductive substrates that form the collector portion in the oxygen-feed-side separator, electrode terminals are provided at the unit conductive substrates which are positioned at ends of the respective array directions and to which said connecting hinges are not connected.

According to the first aspect of the invention, when the fuel-feed-side separator and the oxygen-feed-side separator are bent toward each other and integrated together by the connecting hinges in such a way as to hold the membrane-electrode assembly (MEA) of the fuel cell between them, the lug members on the unit conductive substrates one of the separators that form one unit cell jut out in the adjoining cell region, and the lug members are joined by the connecting hinges to the unit conductive substrates of another separator in the adjoining unit cell, so that the n unit cells are placed in an electrically series connected state without recourse to wirings. It is thus possible to obtain a fuel cell that, because of absence of any contact resistance at connections, has a low internal resistance and is reduced in weight and thickness.

Another object of the invention is to provide a separator that makes it possible to obtain a slimmed-down polymer electrolyte fuel cell which is much reduced in contact resistance with unit cells having a high effective area factor.

According to another aspect of the invention, this object is achievable by the provision of a separator for a flat-type polymer electrolyte fuel cell in which unit cells are arrayed in flat configuration, characterized by comprising:

a collector portion in which two or more unit conductive substrates, each having a plurality of through-holes, are arrayed in flat configuration via gaps, and an electrical insulating outer frame and a membrane-electrode assembly (MEA) side frame that are integrated in such a way as to hold said collector portion therebetween, wherein said outer frame comprises a plurality of minuscule openings in regions in alignment with an array position of said unit conductive substrates, and said membrane-electrode assembly (MEA) side frame comprises an opening in alignment with the array position of said unit conductive substrates.

In one embodiment of the above separator, each minuscule opening in said outer frame is larger in size than said through-holes that each unit conductive substrate has.

According to yet another aspect of the invention, there is provided a separator for a flat-type polymer electrolyte fuel cell in which unit cells are arrayed in flat configuration, characterized by comprising:

a collector portion in which two or more unit conductive substrates, each having a plurality of through-holes, are arrayed in flat configuration via gaps, and an electrical insulating outer frame and a membrane-electrode assembly (MEA) side frame that are integrated in such a way as to hold said collector portion therebetween, wherein said outer frame comprises an opening in alignment with an array position of said unit conductive substrates and a reinforcement provided across said opening, and said membrane-electrode assembly (MEA) side frame comprises an opening in alignment with the array position of said unit conductive substrates.

In one embodiment of the above separator, said reinforcement on said outer frame comprises a plurality of belt-form members.

In another embodiment of the above separator, said outer frame and said membrane-electrode assembly (MEA) side frame are each formed of a resin, a resin/inorganic material composite, a metal having an insulating coating thereon, or ceramics.

According to the second aspect of the invention, the separator has so high strength that even when there is a swelling of the membrane-electrode assembly (MEA) in the flat-type polymer electrolyte fuel cell, the unit conductive substrates that form the separator is in reliable contact with the membrane-electrode assembly (MEA), ensuring uniform contact pressure. Thus, the flat-type polymer electrolyte fuel cell can have a high power generation capability with no or little contact resistance.

According to yet another aspect of the invention, there is provided a separator for a flat-type polymer electrolyte fuel cell in which unit cells are arrayed in flat configuration, characterized by comprising:

a collector portion in which two or more unit conductive substrates, each having a plurality of through-holes, are arrayed in flat configuration via gaps, and an electrical insulating outer frame and a membrane-electrode assembly (MEA) side frame that are integrated in such a way as to hold said collector portion therebetween, wherein:

said outer frame and said membrane-electrode assembly (MEA) side frame each includes an opening in alignment with an array position of said unit conductive substrates, wherein each unit conductive substrate is configured in such a way as to jut toward said opening in said membrane-electrode assembly (MEA) side frame.

In one embodiment of the above separator, each unit conductive substrate is domed in an extent smaller than the area of the opening in said membrane-electrode assembly (MEA) side frame, and said domed portion is in catenary shape.

In another embodiment of the above separator, each unit conductive substrate is projected in an offset shape with an area smaller than the area of the opening in said membrane-electrode assembly (MEA) side frame.

In yet another embodiment of the above separator, said outer frame and said membrane-electrode assembly (MEA) side frame are each formed of a resin, a resin/inorganic material composite, a metal having an insulating coating thereon, or ceramics.

According to the invention as summarized above, the unit conductive substrates that form the separator are each configured in such a way as to jut toward the opening in the membrane-electrode assembly (MEA) side frame, so that even when there is a swelling of the membrane-electrode assembly (MEA) in the flat-type polymer electrolyte fuel cell, the unit conductive substrates work well against that swelling stress, imparting high strength to the separator and, hence, ensuring that the unit conductive substrates are in reliable, sustained contact with the membrane-electrode assembly (MEA). It is thus possible to achieve a flat-type polymer electrolyte fuel cell having an improved power generation capability with no or little contact resistance.

BEST MODE FOR CARRYING OUT THE INVENTION

Some embodiments of the invention are now explained with reference to the accompanying drawings.

Figure 1:
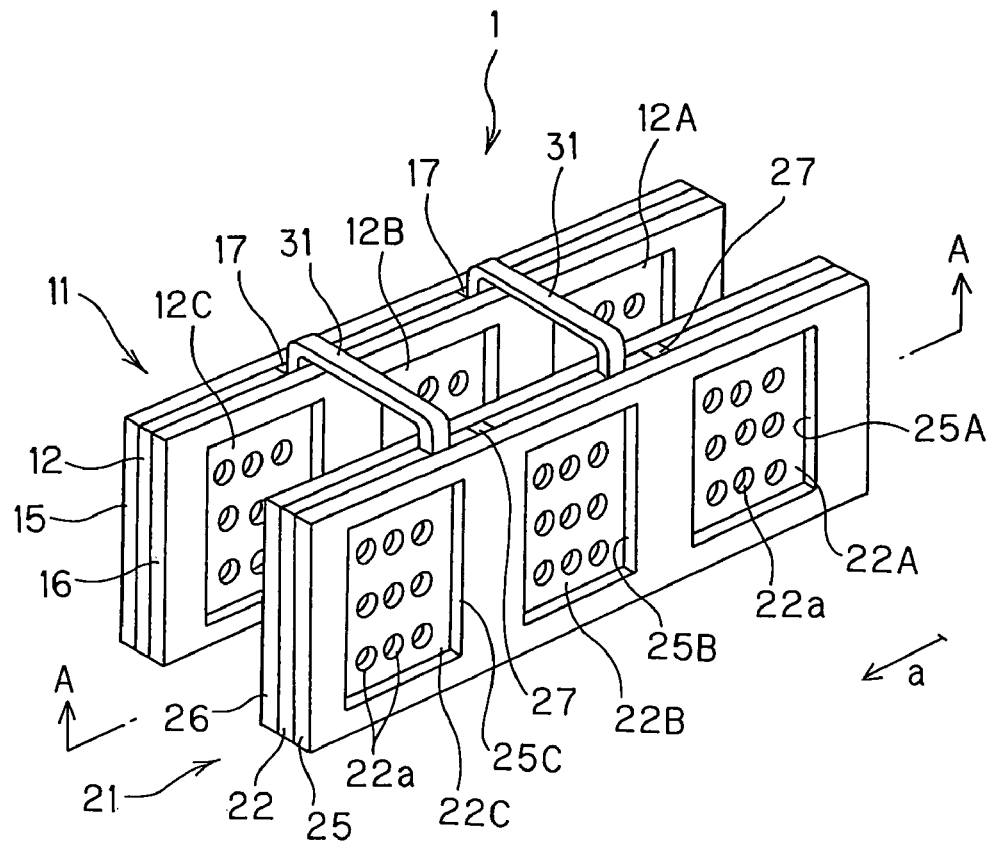
FIG. 1 is illustrative in perspective of one embodiment of the separator for a flat-type polymer electrolyte fuel cell according to the invention.
Figure 2:
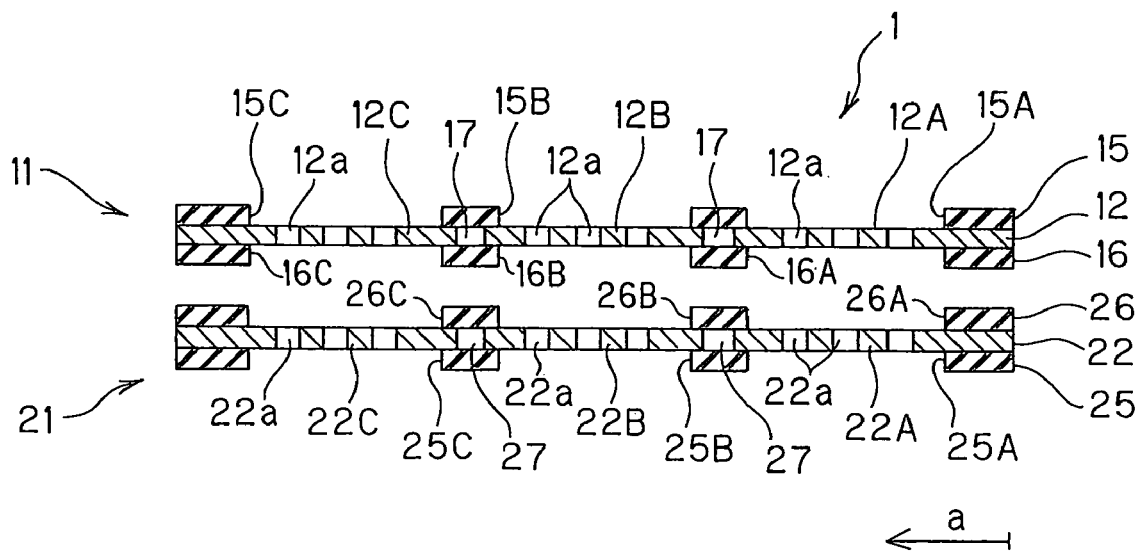
FIG. 2 is a sectional view of the separator depicted in FIG. 1, as taken on an A-A arrow section.
Figure 3:
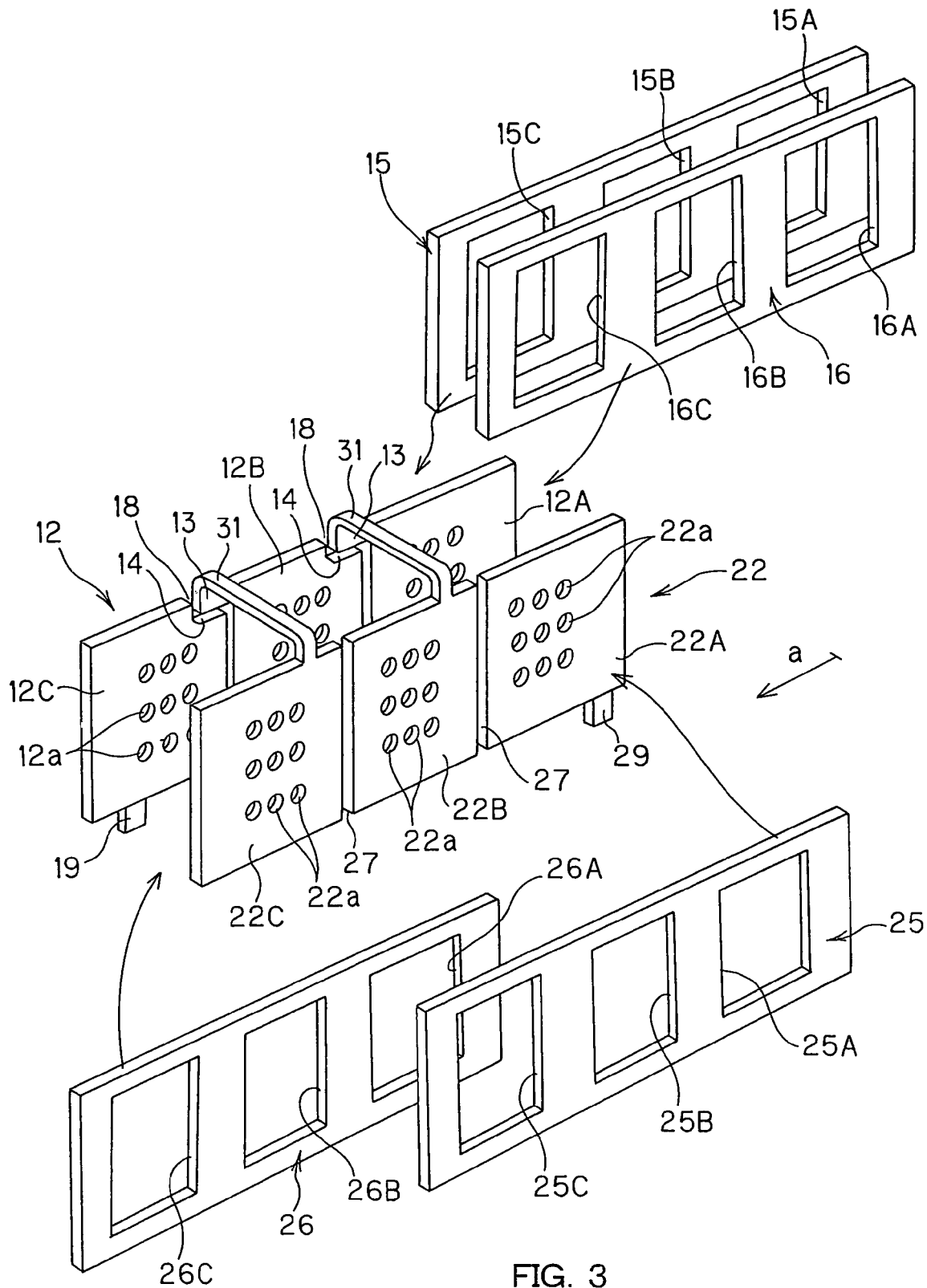
FIG. 3 is illustrative in perspective, as taken apart, of the components forming the separator depicted in FIG. 1.

FIG. 1 is illustrative in perspective of the separator for a flat-type polymer electrolyte fuel cell according to the invention; FIG. 2 is illustrative in section of the separator depicted in FIG. 1, as taken on an A-A arrow section; and FIG. 3 is illustrative in perspective, as taken apart, of the components forming the separator depicted in FIG. 1. Referring to FIGS. 1-3, a separator 1 for the flat-type polymer electrolyte fuel cell according to the invention comprises a fuel-feed-side separator 11, and an oxygen-feed-side separator 21. For convenience of illustration here, the separator 1 is explained as the fuel-feed-side separator 11 and the oxygen-feed-side separator 21; however, it is understood that they are interchangeable. In FIGS. 1-3, it is also noted that the direction shown by an arrow a is the array direction of the unit conductive substrates to be described later.

The fuel-feed-side separator 11 comprises a collector portion 12 wherein three rectangular unit conductive substrates 12A, 12B and 12C, each having a plurality of through-holes 12a, are arrayed in flat configuration via gaps 17, and a pair of insulating frames 15 and 16 that are integrated in such a way as to hold the collector portion 12 between them. The insulating frames 15 and 16 include a set of three openings 15A, 15B and 15C and a set of three openings 16A, 16B and 16C, respectively, in alignment with the array position of the unit conductive substrates 12A, 12B and 12C. At the set of openings 15A, 15B and 15C and the set of openings 16A, 16B and 16C, the unit conductive substrates 12A, 12B and 12C, each having a plurality of through-holes 12a, are exposed.

The oxygen-feed-side separator 21, too, comprises a collector portion 22 wherein three rectangular unit conductive substrates 22A, 22B and 22C, each having a plurality of through-holes 22a, are arrayed in flat configuration via gaps 27, and a pair of insulating frames 25 and 26 that are integrated in such a way as to hold the collector portion 22 between them. The insulating frames 25 and 26 include a set of three openings 25A, 25B and 25C and a set of three openings 26A, 26B and 26C, respectively, in alignment with the array position of the unit conductive substrates 22A, 22B and 22C. At the set of openings 25A, 25B and 25C and the set of openings 26A, 26B and 26C, the unit conductive substrates 22A, 22B and 22C, each having a plurality of through-holes 22a, are exposed.

In the above fuel-feed-side separator 11, the first and second unit conductive substrates 12A and 12B of the three rectangular unit conductive substrates forming a part of the collector portion 12, as counted from one end (on the right side in FIG. 3) of the array direction (indicated by the arrow a), include lug members 13 at their corners, which jut or extend toward the adjoining unit conductive substrates (12B and 12C). The second and third unit conductive substrates 12B and 12C, as counted from the end (on the right side in FIG. 3) of the array direction (indicated by the arrow a), include cutouts 14 at those corners in such a way as to leave gaps 18 away from the lug members 13 of the adjoining unit conductive substrates (12A and 12B) on the upstream side of the array direction and match in configuration with the lug members 13.

The unit conductive substrates 22A, 22B and 22C that form a part of the oxygen-feed-side separator 21 are equivalent in configuration to the unit conductive substrates 12A, 12B and 12C except that neither lug members 13 nor cutouts 14 are provided, and arrayed via gaps 27 of the same size to form the collector portion 22.

Furthermore, the unit conductive substrates 12A and 12B of the collector portion 12 that form a part of the fuel-feed-side separator 11 include connecting hinges 31 at the respective lug members 13, which jut or project in a direction substantially orthogonal to the array direction (indicated by the arrow a) of the unit conductive substrates 12A, 12B and 12C. By means of two such connecting hinges 31, the second and third unit conductive substrates 22B and 22C of the three unit conductive substrates 22A, 22B and 22C that form a part of the collector portion 22 of the oxygen-feed-side separator 21, as counted from the end of the array direction (indicated by the arrow a), are connected to the lug members 13 of the unit conductive substrates 12A and 12B, respectively.

The collector portion 12 that forms a part of the fuel-feed-side separator 11 includes an electrode terminal 19 at the unit conductive substrate 12C of the three unit conductive substrates 12A, 12B and 12C, which is positioned at the end of the array direction (indicated by the arrow a) and have no lug member 13. On the other hand, the collector portion 22 that forms a part of the oxygen-feed-side separator 21 includes an electrode terminal 29 at the unit conductive substrate 22A of the three unit conductive substrates 22A, 22B and 22C, which is positioned at the end of the array direction (indicated by the arrow a) and has no connecting hinge 31 connected to it.

A conductive material used for the unit conductive substrates 12A, 12B and 12C that form a part of the collector portion 12 and the unit conductive substrates 22A, 22B and 22C that form a part of the collector portion 22 should preferably be well conductive, ensure the desired strength, and be easy to process. For instance, stainless steel, cold-rolled steel sheet, aluminum, copper, and titanium could be used. The connecting hinges 31 may be the same material as the conductive substrates 12A, 12B, 12C, 22A, 22B and 22C.

Also, the unit conductive substrates 12A, 12B and 12C should each preferably have at least on its surface portion that provides the electrolyte side of the fuel cell a protective layer comprising a resin layer of corrosion resistance (acid resistance) and electrical conductivity. Such a protective layer, for instance, could be provided by a method wherein a resin mingled with carbon particles and a conductive material such as a corrosion-resistant metal is formed by electrochemical deposition into a film and that film is then heated and cured, or a method wherein a film comprising a conductive polymer resin containing an electrical conductive enhancement dopant is formed by electrolytic polymerization.

Alternatively, the unit conductive substrates 12A, 12B and 12C could be each gilded or otherwise plated to have a corrosion-resistant metal layer without detrimental to electrical conductivity. Furthermore, such a corrosion-resistant metal layer could be provided on it with a protective layer having acid resistance and electrical conductivity.

In this connection, it is noted that each connecting hinge 31 could be covered up with an insulating resin coating.

The unit conductive substrates 12A, 12B, 12C, 22A, 22B and 22C have been each configured into the given shape by machining, or etching relying on photolithography, and the lug members 13, cutouts 14 and fuel or oxygen feed through-holes 12a and 22a have been provided by those techniques as well.

A pair of insulating frames 15 and 16 forming another part of the fuel-feed-side separator 11 and a pair of insulating frames 25 and 26 forming another part of the oxygen-feed-side separator 21 should preferably be made of a material that is of insulating nature, easy to process, and of lightweight and high mechanical strength. Such materials, for instance, include substrate materials for printed wiring board substrates such as glass epoxy and polyimide. Each insulating frame of the desired shape 15, 16, 25, 26 could be formed by machining, laser processing, and so on.

Typically, the fuel-feed-side separator 11 and the oxygen-feed-side separator 21 could be fabricated by a process wherein the collector portions 12 and 22 are prepared while they are joined together via the connecting hinges 31, and the thus prepared collector portion 12 is aligned with and fixed to the insulating frames 15 and 16 while, at the same time, the thus prepared collector portion 22 is aligned with and fixed to the insulating frames 25 and 26.

Figure 4:
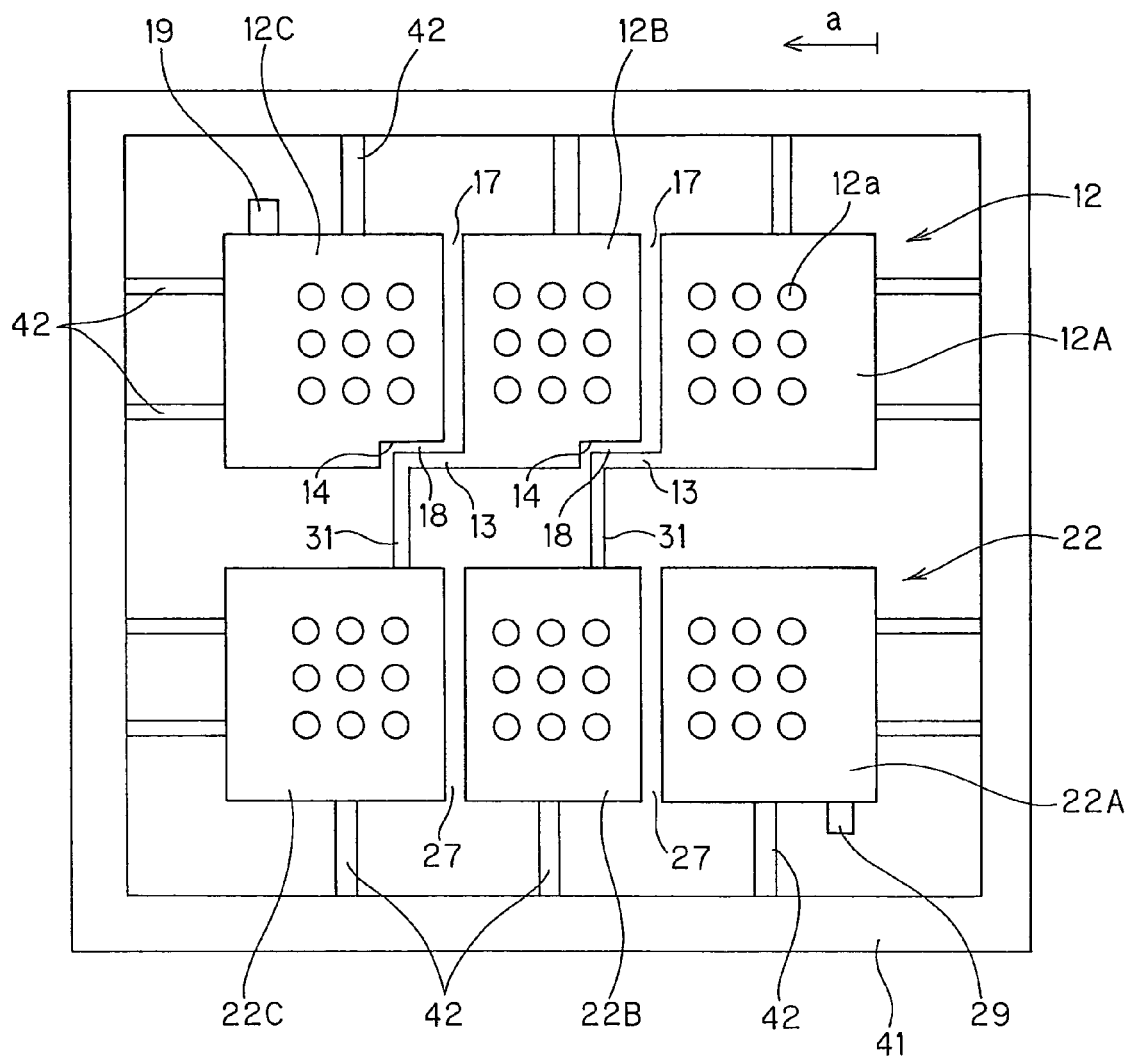
FIG. 4 is illustrative of one example of the collector portion used for separator fabrication.

FIG. 4 is illustrative of one example of the collector portions 12 and 22 fabricated while they are connected together via the connecting hinges 31. In the collector portion 12 depicted in FIG. 4, three unit conductive substrates 12A, 12B and 12C are supported on an outer frame 41 via a plurality of ribs 42 in such a way that the unit conductive substrates 12A, 12B and 12C, each having a plurality of through-holes 12a, are arrayed in flat configuration via gaps 17. In the collector portion 22, three unit conductive substrates 22A, 22B and 22C are supported on the outer frame 41 via a plurality of ribs 42 in such a way that the unit conductive substrates 22A, 22B and 22C, each having a plurality of through-holes 22a, are arrayed in flat configuration via gaps 27. And then, the lug members 13 of the unit conductive substrates 12A and 12B are joined to the unit conductive substrates 22B and 22C by means of the respective connecting hinges 31.

The insulating frames 15 and 16 are aligned with and fixed to such unit conductive substrates 12A, 12B and 12C as mentioned above, and the insulting frames 25 and 26 are aligned with and fixed to the unit conductive substrates 22A, 22B and 22C, after which the ribs 42 are cut off for removal of the outer frame 41, thereby obtaining the separator 1 of the invention comprising the fuel-feed-side separator 11 and the oxygen-feed-side separator 21 joined together by means of the connecting hinges 31.

Fixation of the respective components mentioned above, for instance, could be implemented by coating or laminating an adhesive such as epoxy resin or polyimide resin on them, and curing the adhesive while they are stacked one upon another. The adhesive used here is not critical insofar as it has no influence on other components during the fabrication process, and when used with a fuel cell, it is well resistant to its operating conditions.

Alternatively, a part or the whole of the insulating frames 15, 16, 25 and 26 could be provided in prepreg form in a semi-cured state, and then pressed down to the collector portions 12 and 22 for fixation.

Because the given unit conductive substrates that form the fuel-feed-side separator 11 and the oxygen-feed-side separator 21 are joined together by means of the connecting hinges 31, the separator 1 of the invention dispenses with any intrigued wirings, and makes a sensible tradeoff between strength and weight reductions. When it is used with a flat-type polymer electrolyte fuel cell, the above connecting hinges 31 are bent down to hold the membrane-electrode assembly (MEA) in place. It is thus possible to fabricate with ease a flat-type polymer electrolyte fuel cell comprising a plurality of unit cells electrically connected in series.

The above separator of the invention is explained by way of example alone, and so the invention is never ever limited thereto. For instance, the fuel-feed-side separator and the oxygen-feed-side separator depicted in FIGS. 1-4 are each one comprising an array of three unit conductive substrates; however, it is understood that two, or four or more unit conductive substrates could be equally applied.

Figure 5:
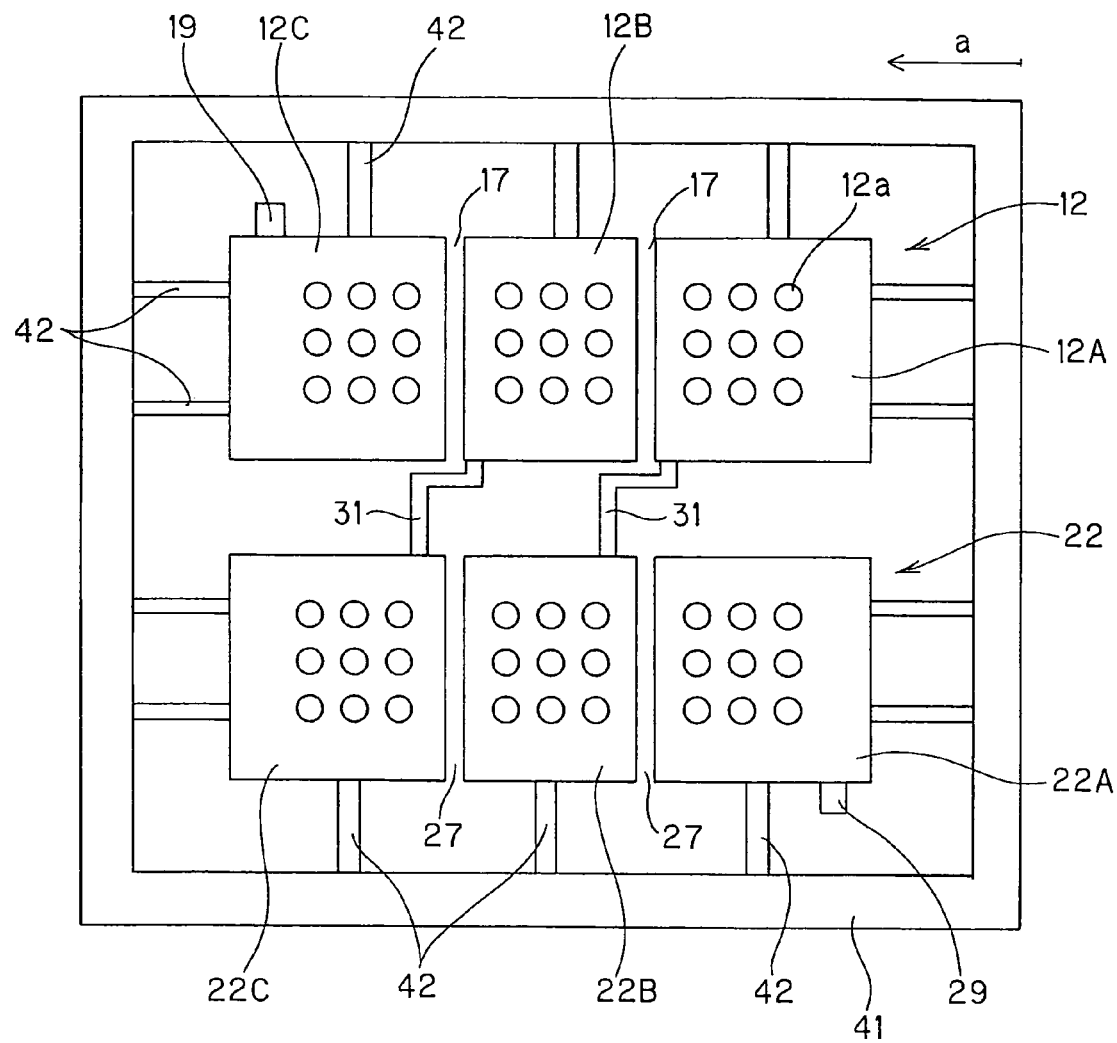
FIG. 5 is illustrative of another example of the collector portion used for separator fabrication.

As depicted in FIG. 5, it is acceptable to successively join together the unit conductive substrates 12A, 12B and the unit conductive substrates 22B, 22C by means of two connecting hinges 31. It is then appreciated that the unit conductive substrates 12A and 12B have no lug member 13, and the unit conductive substrates 12B and 12C have no cutout 14, either.

The gaps 17 lying between the respective unit conductive substrates 12A, 12B and 12C of the fuel-feed-side separator 11, and the gaps 27 found between the unit conductive substrates 22A, 22B and 22C of the oxygen-feed-side separator 21 could be filled up with an insulating material such as an adhesive, for instance, epoxy resin or fluororesin.

The openings 15A, 15B and 15C in the insulating frame 15, and the openings 25A, 25B and 25C in the insulating frame 25 could be configured in the form of a set of openings.

Furthermore, when the separator of the invention is used with a flat-type polymer electrolyte fuel cell, for instance, gas diffusion or catalytic layers could be provided within the openings 16A, 16B, 16C and the openings 26A, 26B and 26C in the insulating frames 16 and 26, respectively, positioned on the membrane-electrode assembly (MEA) side in such a way that the unit conductive substrates 12A, 12B, 12C and 22A, 22B, 22C of the collector portions 12 and 22, respectively, are covered up with them.

The above gas diffusion layer comprises a porous collector material, and could be made of carbon fibers, alumina, and so on. The thickness of the gas diffusion layer could be properly selected from the range of, for instance, about 20 to 500 µm.

In this regard, the catalytic layer works as a fuel electrode when the separator is used as the fuel-feed-side separator, and as an oxygen electrode when it is used as the oxygen-feed-side separator. Such catalytic layers, for instance, are formed of platinum, gold, palladium, ruthenium, copper, platinum oxides, tungsten oxides, iron, nickel and rhodium which could be used alone or in combinations of two or more. Catalytic layer thickness could be properly selected from the range of, for instance, about 10 to 300 µm.

One example of the flat-type polymer electrolyte fuel cell incorporating the separator of the invention is now explained.

Figure 6:
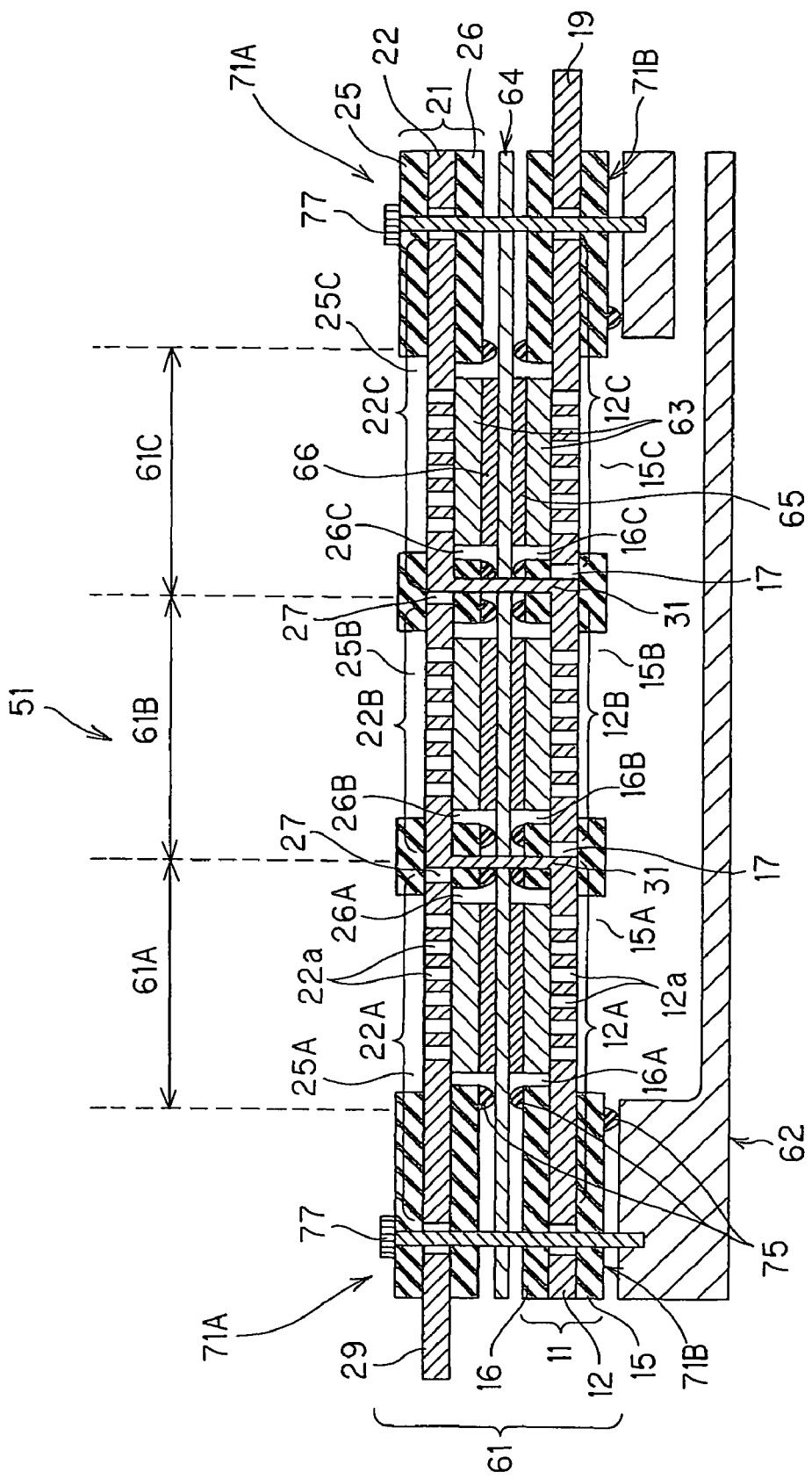
FIG. 6 is illustrative in construction of one example of a flat-type polymer electrolyte fuel cell using the separator of the invention.

FIG. 6 is illustrative in construction of the flat-type polymer electrolyte fuel cell in which there is incorporated the separator 1 of the invention comprising such fuel-feed-side separator 11 and oxygen-feed-side separator 12 as mentioned above, and FIG. 7 is illustrative, as taken apart, of the components of the flat-type polymer electrolyte fuel cell depicted in FIG. 6.

Figure 7:
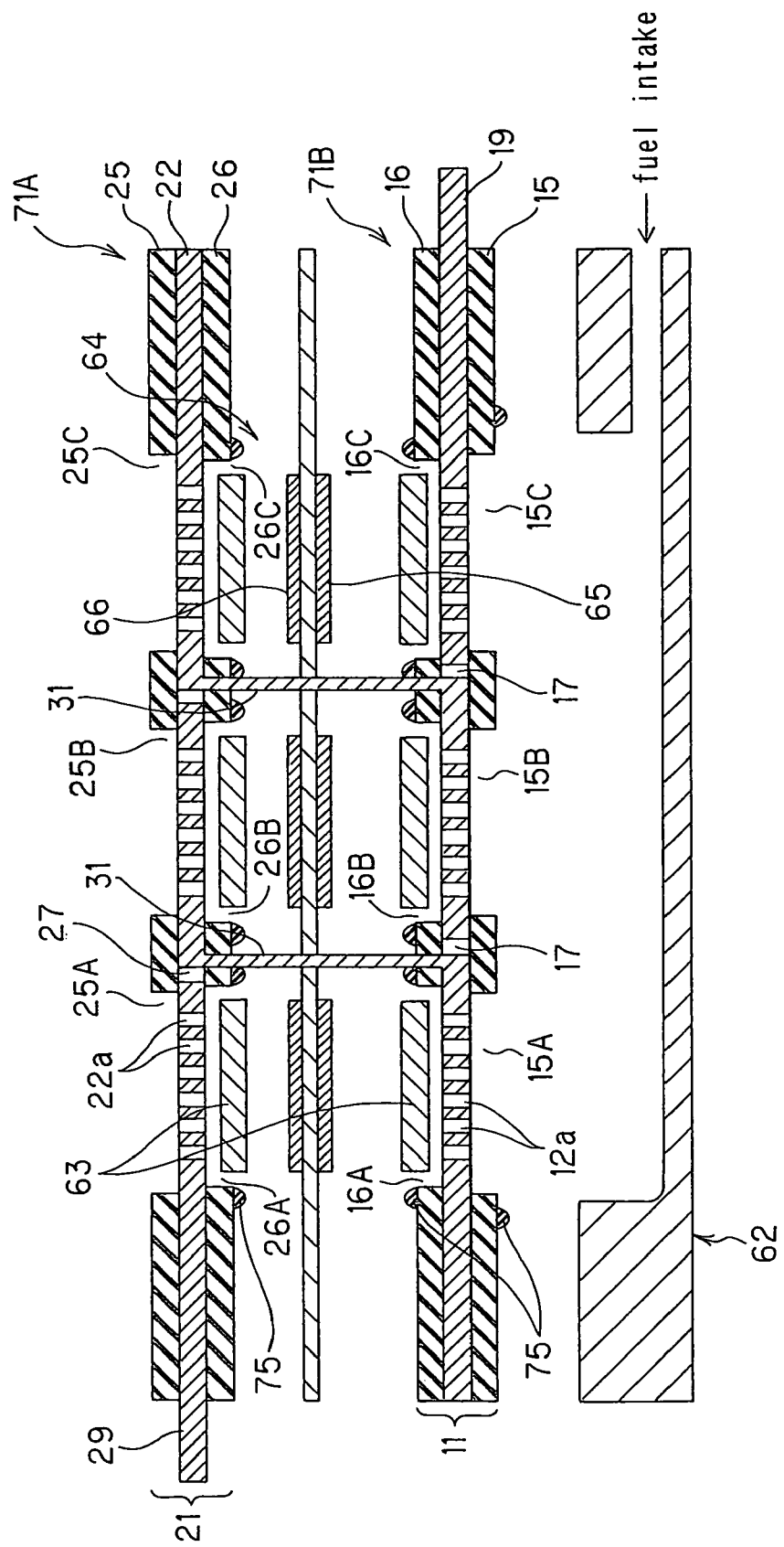
FIG. 7 is illustrative of the components, as taken apart, of the flat-type polymer electrolyte fuel cell depicted in FIG. 6.

Referring to FIGS. 6 and 7, a polymer electrolyte fuel cell 51 comprises a cell body 61 with a membrane-electrode assembly (MEA) 64 interposed between a fuel-feed-side separator 11 and an oxygen-feed-side separator 21 forming a separator 1 set of the invention, and a casing 62.

In the cell body 61, the separator 1 is bent down at connecting hinges 31 in such a way as to bring the respective insulating frames 16 and 26 of the fuel-feed-side separator 11 and the oxygen-feed-side separator 21 opposite to the membrane-electrode assembly (MEA) 64, and the collector portions 12 and 22 of the fuel-feed-side separator 11 and the oxygen-feed-side separator 21 abut against the membrane-electrode assembly (MEA) 64 via carbon papers 63. Then, the membrane-electrode assembly (MEA) 64 comprises a fuel-electrode-side catalytic layer 65 on the side of the fuel-feed-side separator 11, and an oxygen-electrode-side catalytic layer 66 on the side of the oxygen-feed-side separator 21.

Thus, three unit cells 61A, 61B and 61C are arrayed in flat configuration. Between the three unit cells 61A, 61B and 61C, the collector portion 12 (unit conductive substrates 12A, 12B and 12C) is electrically connected to the collector portion 22 (unit conductive substrates 22A, 22B and 22C) by means of connecting hinges 31 and lug members 13.

Each connecting hinge 31 here could be covered up with an insulating resin to apply an insulating coating on it.

In the above cell body 61, both ends of the membrane-electrode assembly (MEA) 64 are held between outermost separator frames 71A and 71B of the separator set via sealing members 75. And then, fixing bolts 77 are used to fix the cell body 61 to the casing 62 via the sealing members 75.

The above outermost separator frame 71A includes an electrode terminal 29 in connection to the unit conductive substrate 22A of the oxygen-feed-side separator 21, which forms the unit cell 61A, and the outermost separator frame 71B includes an electrode terminal 19 in connection to the unit conductive substrate 12C of the fuel-feed-side separator 11, which forms the unit cell 61C. Thus, three unit cells 61A, 61B and 61C are electrically connected in series, as schemed below.

Electrode Terminal 29→*

*→Unit Cell 61A [Unit Conductive Substrate 22A of Separator 21→Membrane-Electrode Assembly (MEA) 64→Unit Conductive Substrate 12A of Separator 11→Lug member 13]→Connecting Hinge 31→*

*→Unit Cell 61B [Unit Conductive Substrate 22B of Separator 21→Membrane-Electrode Assembly (MEA) 64→Unit Conductive Substrate 12B of Separator 11→Lug member 13]→Connecting Hinge 31→*

*→Unit Cell 61C [Unit Conductive Substrate 22C of Separator 21→Membrane-Electrode Assembly (MEA) 64→Unit Conductive Substrate 12C of Separator 11]→*

*→Electrode Terminal 19

Such a polymer electrolyte fuel cell 51, because the three unit cells 61A, 61B and 61C are connected together by means of the connecting hinges 31, dispenses with any connecting step using separate connecting members, and has an ever higher power generation capability with no or little contact resistance.

Figure 8:
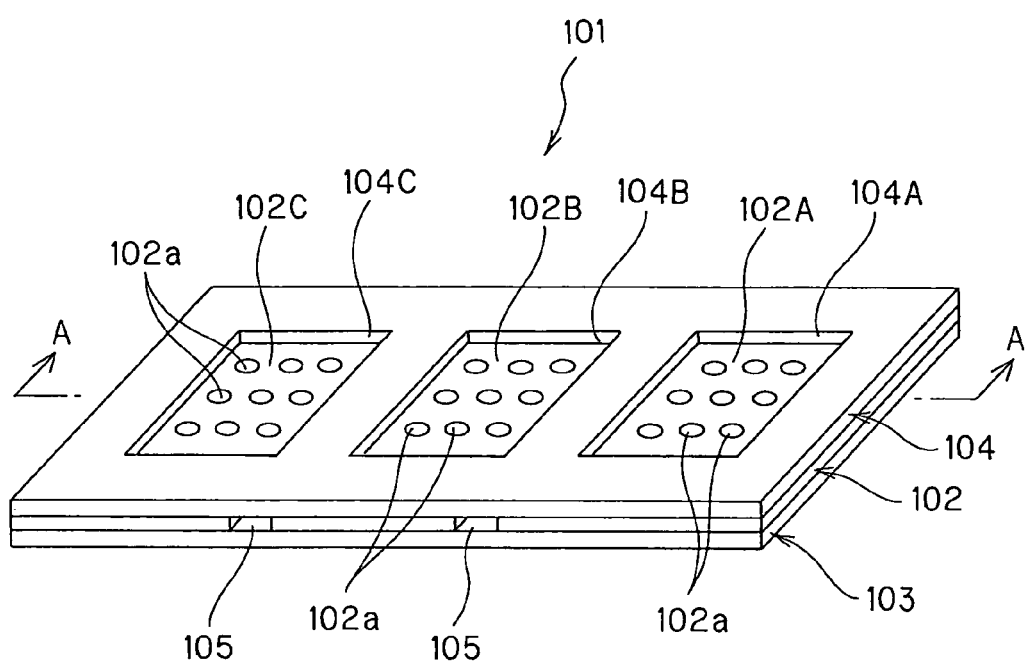
FIG. 8 is illustrative in perspective of one embodiment of the separator for a flat-type polymer electrolyte fuel cell according to the invention.
Figure 9:
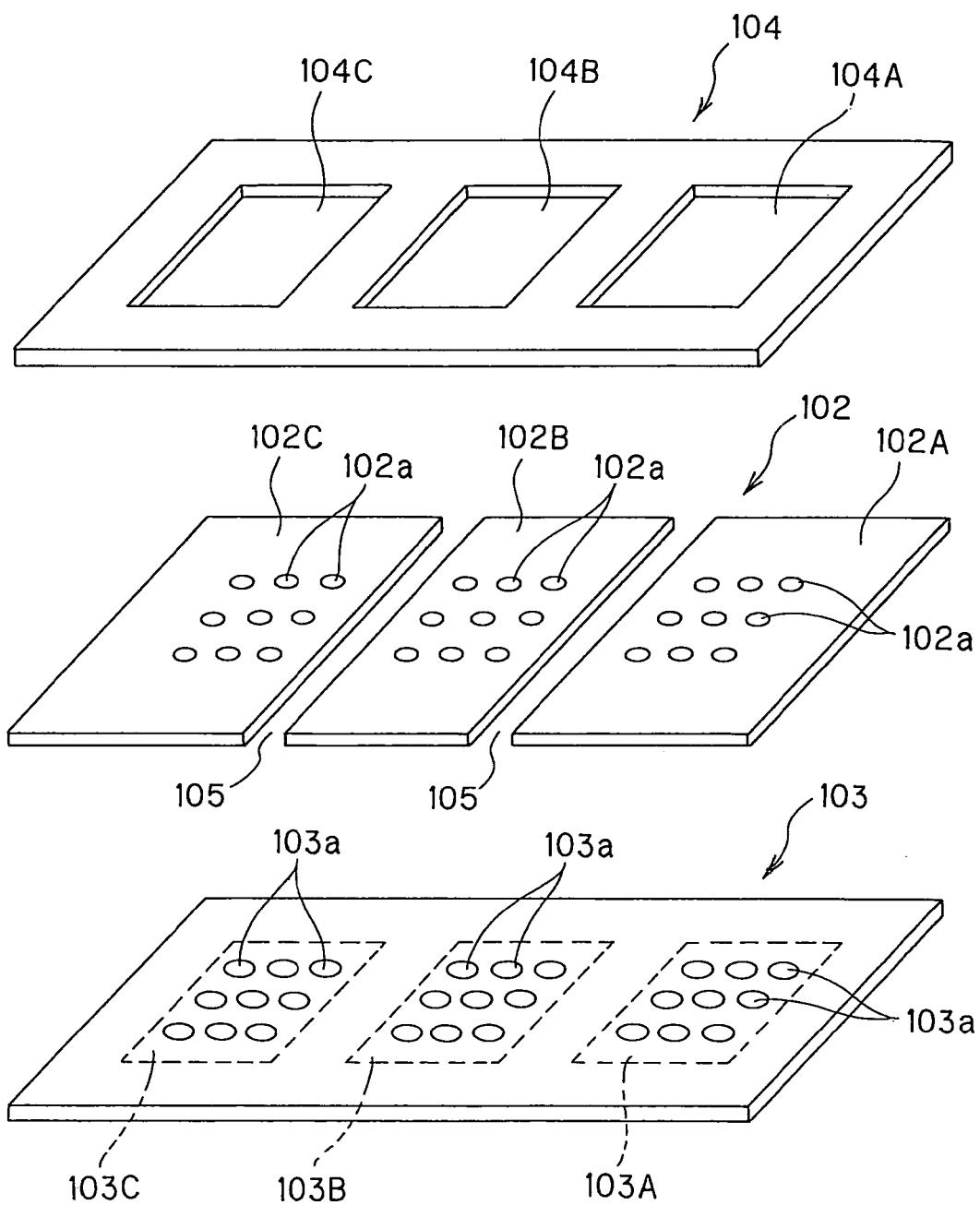
FIG. 9 is illustrative in perspective, as taken apart, of the collector portion, outer frame and membrane-electrode assembly (MEA) side frame that form the separator depicted in FIG. 8.
Figure 10:
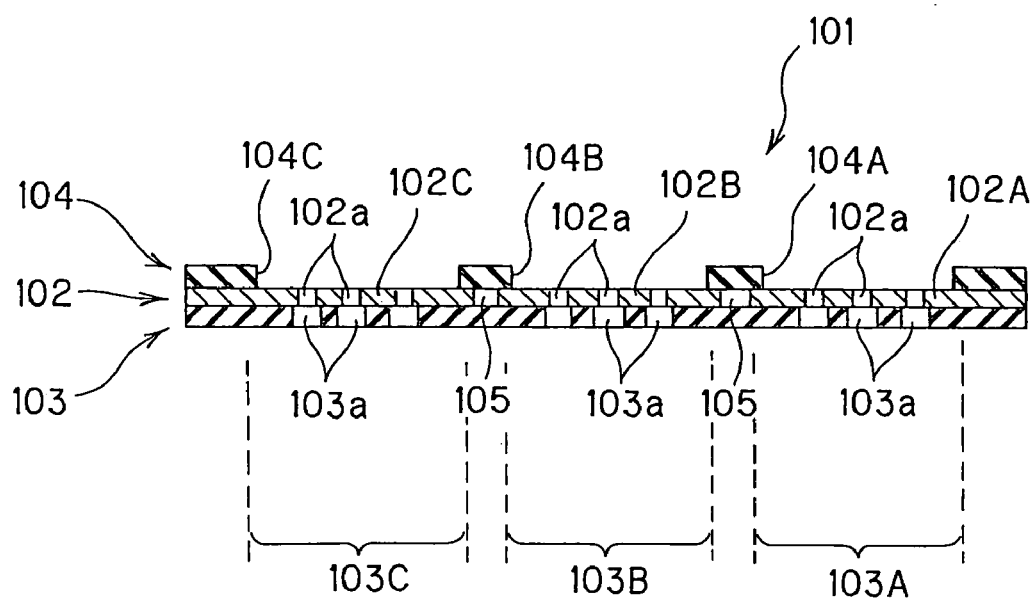
FIG. 10 is a sectional view of the separator depicted in FIG. 8, as taken on an A-A arrow section.

FIG. 8 is illustrative in perspective of one embodiment of the separator of the invention for a flat-type polymer electrolyte fuel cell; FIG. 9 is illustrative in perspective, as taken apart, of the collector portions, outer frame, and membrane-electrode assembly (MEA) side frame that form together the separator depicted in FIG. 8; and FIG. 10 is a sectional view of the separator depicted in FIG. 8, as taken on an A-A arrow section. In FIGS. 8-10, a separator 101 of the invention comprises an outer frame 103 and a membrane-electrode assembly (MEA) side frame 104, which are integrated in such a way as to hold a collector portion 102 between them.

In the collector portion 102 forming a part of the separator 101, three rectangular unit conductive substrates 102A, 102B and 102C, each having a plurality of through-holes 102a, are arrayed in flat configuration via gaps 105.

A conductive material used for such a collector portion 102 (the unit conductive substrates 102A, 102B and 102C) should preferably be well conductive, ensure the desired strength, and be easy to process. For instance, stainless steel, cold-rolled steel sheet, aluminum, copper, and titanium could be used.

Also, the unit conductive substrates 102A, 102B and 102C should each preferably have at least on its surface abutting against the membrane-electrode assembly (MEA) side frame 104 a protective layer comprising a resin layer of corrosion resistance (acid resistance) and electrical conductivity. Such a protective layer, for instance, could be provided by a method wherein a resin mingled with carbon particles and a conductive material such as a corrosion-resistant metal is formed by electrochemical deposition into a film and that film is then heated and cured, or a method wherein a film comprising a conductive polymer resin containing an electrical conductivity enhancement dopant is formed by electrolytic polymerization.

Alternatively, the unit conductive substrates could be each gilded or otherwise plated on its surface to have a corrosion-resistant metal layer without detrimental to electrical conductivity. Furthermore, such a corrosion-resistant metal layer could be provided on it with a protective layer having acid resistance and electrical conductivity.

The respective unit conductive substrates 102A, 102B, 102C have been each configured into the given shape by machining, or etching relying on photolithography, and fuel or oxygen feed through-holes 102a have been provided by those techniques as well. No particular limitation is imposed on the size (opening diameter) of each through-hole 102a, which could be properly selected from the range of, for instance, about 0.05 to 10 mm.

In the embodiment illustrated, nine through-holes 102a are provided in each unit conductive substrate; however, it is understood that no particular limitation is placed on how many holes are provided, and where they are formed.

The outer frame 103 integrated in such a way as to hold such a collector portion 102 as described above in place includes a plurality of minuscule openings 103a in regions 103A, 103B and 103C (surrounded by chain lines in FIG. 9) in alignment with the array position of the above unit conductive substrates 102A, 102B and 102C. Lying at positions corresponding to the through-holes 102a in the respective unit conductive substrates 102A, 102B and 102C that form a part of the collector portion 102, these minuscule openings 103a are sized in such a way as not to clog up the through-holes 102. In other words, the size of each minuscule opening 103a should preferably be larger than that of each through-hole 102a. Note here that it is not always required to locate the minuscule openings 103a at positions in alignment with the individual through-holes 102a; for instance, it is acceptable to provide a minuscule opening 103a large enough to extend across a plurality of through-holes 102a.

The size, number, etc. of the minuscule openings 103a in the outer frame 103 could be determined, considering the material, thickness, etc. of the outer frame 103 such that strength high enough to maintain contact of the unit conductive substrates 102A, 102B and 102C that form a part of the separator 101 with the membrane-electrode assembly (MEA) is achievable against the swelling of the membrane-electrode assembly (MEA) when it is used with a flat-type polymer electrolyte fuel cell.

The membrane-electrode assembly (MEA) side frame 104 integrated in such a way as to hold the collector portion 102 in place includes three openings 104A, 104B and 104C in alignment with the array position of the respective unit conductive substrates 102A, 102B and 102C. And then, in the respective openings 104A, 104B and 104C, the through-holes 102a in the respective unit conductive substrates 102A, 102B and 102C that form a part of the collector portion 102 are exposed.

The outer frame 103 and the membrane-electrode assembly (MEA) side frame 104 that form together the separator 101 should preferably be made of a material that is of insulating nature, easy to process, and of lightweight and high mechanical strength. Such materials, for instance, include substrate materials for printed wiring board substrates such as resins like polyimide, composite materials of resins like glass epoxy and inorganic materials, metals having an insulating coating on them, and ceramics. For such metals with insulating coatings, for instance, an Al-containing SUS material with an insulating coating formed on its surface by heat treatment, and an Al material with an insulating coating formed on its surface by anodizing could be used.

The outer frame 103 and the membrane-electrode assembly (MEA) side frame 104, each having such shape as described above, could be formed by machining, laser processing, and so on. The outer frame 103 and the membrane-electrode assembly (MEA) side frame 104 could be identical with or different from each other in terms of thickness.

The gaps 105 lying between the unit conductive substrates 102A, 102B and 102C could be filled up with an insulating material such as epoxy resin or fluororesin as an adhesive.

Such a separator 101 of the invention is given high strength by the outer frame 103 of such structure as described above, and so ensures that even when the membrane-electrode assembly (MEA) swells upon used with a flat-type polymer electrolyte fuel cell, the unit conductive substrates 102A, 102B and 102C that form a part of the separator 101 are in reliable contact with the membrane-electrode assembly (MEA), giving uniform contact pressure.

Figure 11:
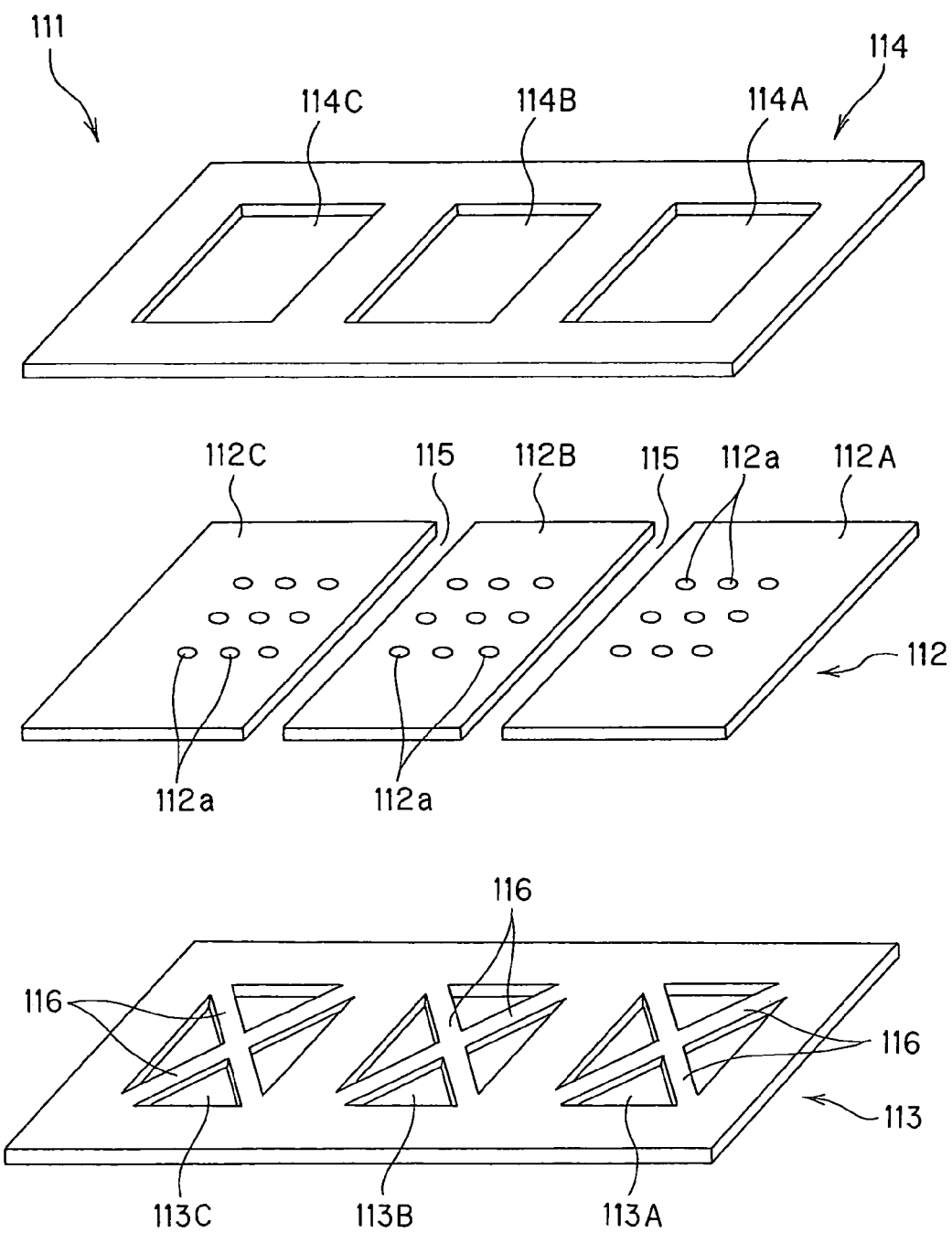
FIG. 11 is illustrative in section, as in FIG. 2, of another embodiment of the separator for a flat-type polymer electrolyte fuel cell according to the invention.

FIG. 11 is illustrative in perspective of another embodiment of the separator of the invention for a flat-type polymer electrolyte fuel cell. In FIG. 11, the separator 111 of the invention comprises an outer frame 113 and a membrane-electrode assembly (MEA) side frame 114 that are integrated in such a way as to hold a collector portion 112 between them.

The collector portion 112 that forms a part of the separator 111 is similar to the collector portion 102 in the above embodiment, and comprises three rectangular unit conductive substrates 112A, 112B and 112C, each having a plurality of through-holes 112a, which are arrayed in flat configuration via gaps 115.

The outer frame 113 that is integrated in such a way as to hold the collector portion 112 in place comprises three openings 113A, 113B and 113C in alignment with the array position of the above respective unit conductive substrates 112A, 112B and 112C, with a reinforcement 116 provided across each opening. The reinforcement 116 comprises two belt-form materials that intersect substantially at the center of each opening 113A, 113B, 113C.

Figure 12:
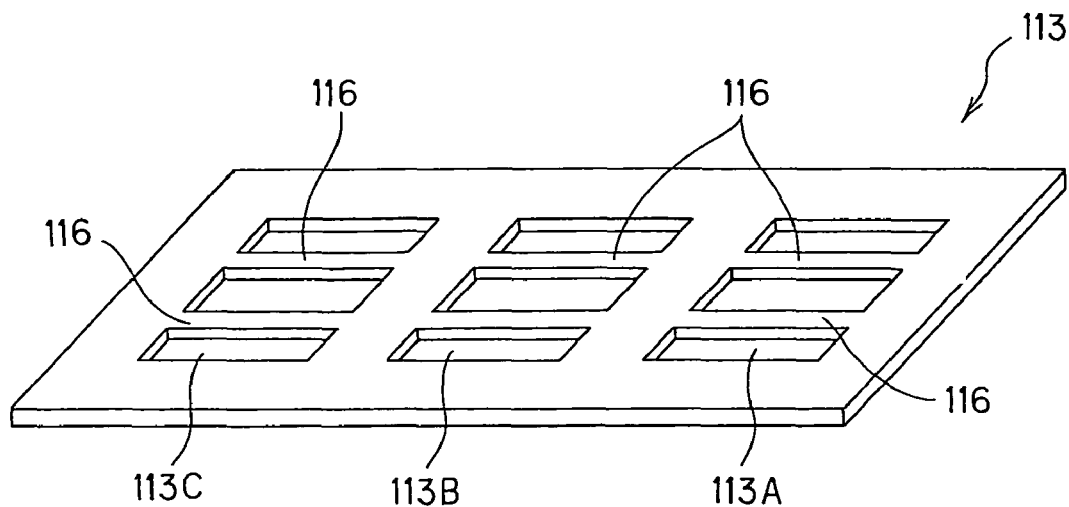
FIG. 12 is illustrative in perspective of another embodiment of the outer frame that forms a part of the separator depicted in FIG. 11.
Figure 13:
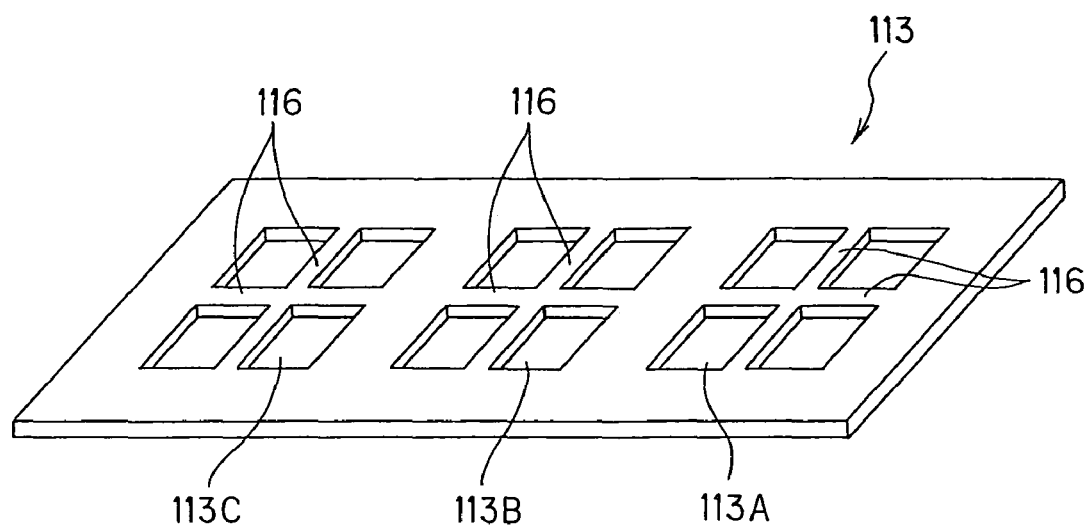
FIG. 13 is illustrative in perspective of yet another embodiment of the outer frame that forms a part of the separator depicted in FIG. 11.

The reinforcement 116 for the outer frame 113 is never ever limited to that illustrated in FIG. 11. For instance, it could comprise a plurality of parallel belt-form materials provided across the opening in ladder form, as shown in FIG. 12 or, alternatively, it could comprise two belt-form materials that are parallel with the ends of the opening 113A, 113B, and 113C, and intersect substantially at the center of the opening, as shown in FIG. 13.

The thickness, width, etc. of the above reinforcement 116 could be determined, considering the material of the outer frame 113, the size of the openings 113A, 113B and 113C, etc. such that strength high enough to maintain contact of the unit conductive substrates 112A, 112B and 112C that form a part of the separator 111 with the membrane-electrode assembly (MEA) is achievable against the swelling of the membrane-electrode assembly (MEA) when it is used with a flat-type polymer electrolyte fuel cell.

The membrane-electrode assembly (MEA) side frame 114 is similar to the membrane-electrode assembly (MEA) side frame 104 in the above embodiment, and comprises three openings 114A, 114B and 114C in alignment with the array position of the above respective unit conductive substrates 112A, 112B and 112C.

The collector portion 112 (unit conductive substrates 112A, 112B and 112C), which forms a part of the separator 111, is made of a similar material to that of the collector portion 102 (unit conductive substrates 102A, 102B and 102C), which forms a part of the above separator 101. The unit conductive substrates 112A, 112B and 112C, too, could each have a protective layer if required, as is the case with the above embodiment.

The outer frame 113 and the membrane-electrode assembly (MEA) side frame 114 that form together a part of the separator 111 are made of a similar material to that of the outer frame 103 and the membrane-electrode assembly (MEA) side frame 104 that forms together a part of the above separator 101. The outer frame 113 and the membrane-electrode assembly (MEA) side frame 114, each having such desired shape as described above, could be formed by means of machining, laser processing, and so on. The outer frame 113 and the membrane-electrode assembly (MEA) side frame 114 could be identical with or different from each other in terms of thickness.

Such a separator 111 of the invention is given high strength by the outer frame 113 having such reinforcements 116 as described above, and so ensures that even when the membrane-electrode assembly (MEA) swells upon used with a flat-type polymer electrolyte fuel cell, the unit conductive substrates 112A, 112B and 112C that form a part of the separator 111 are in reliable contact with the membrane-electrode assembly (MEA), giving uniform contact pressure.

The above separator of the invention is provided by way of example alone, and the invention is never ever limited thereto. For instance, gas diffusion or catalytic layers could be provided within the openings 104A, 104B, 104C, 114A, 114B and 114C in the membrane-electrode assembly (MEA) side frames 104 and 114 in such a way as to cover up the unit conductive substrates 102A, 102B, 102C, 112A, 112B and 112C in the collector portions 102 and 112.

The above gas diffusion layer comprises a porous collector material, and could be made of carbon fibers, and so on. The thickness of the gas diffusion layer could be properly selected from the range of, for instance, about 20 to 500 μm.

In this regard, the catalytic layer works as a fuel electrode when the separator is used as the fuel-feed-side separator, and as an oxygen electrode when it is used as the oxygen-feed-side separator. Such catalytic layers, for instance, are formed of platinum, gold, palladium, ruthenium, copper, platinum oxides, tungsten oxides, iron, nickel and rhodium which could be used alone or in combinations of two or more. Catalytic layer thickness could be properly selected from the range of, for instance, about 10 to 300 μm.

One example of the flat-type polymer electrolyte fuel cell incorporating the separator of the invention is now explained.

Figure 14:
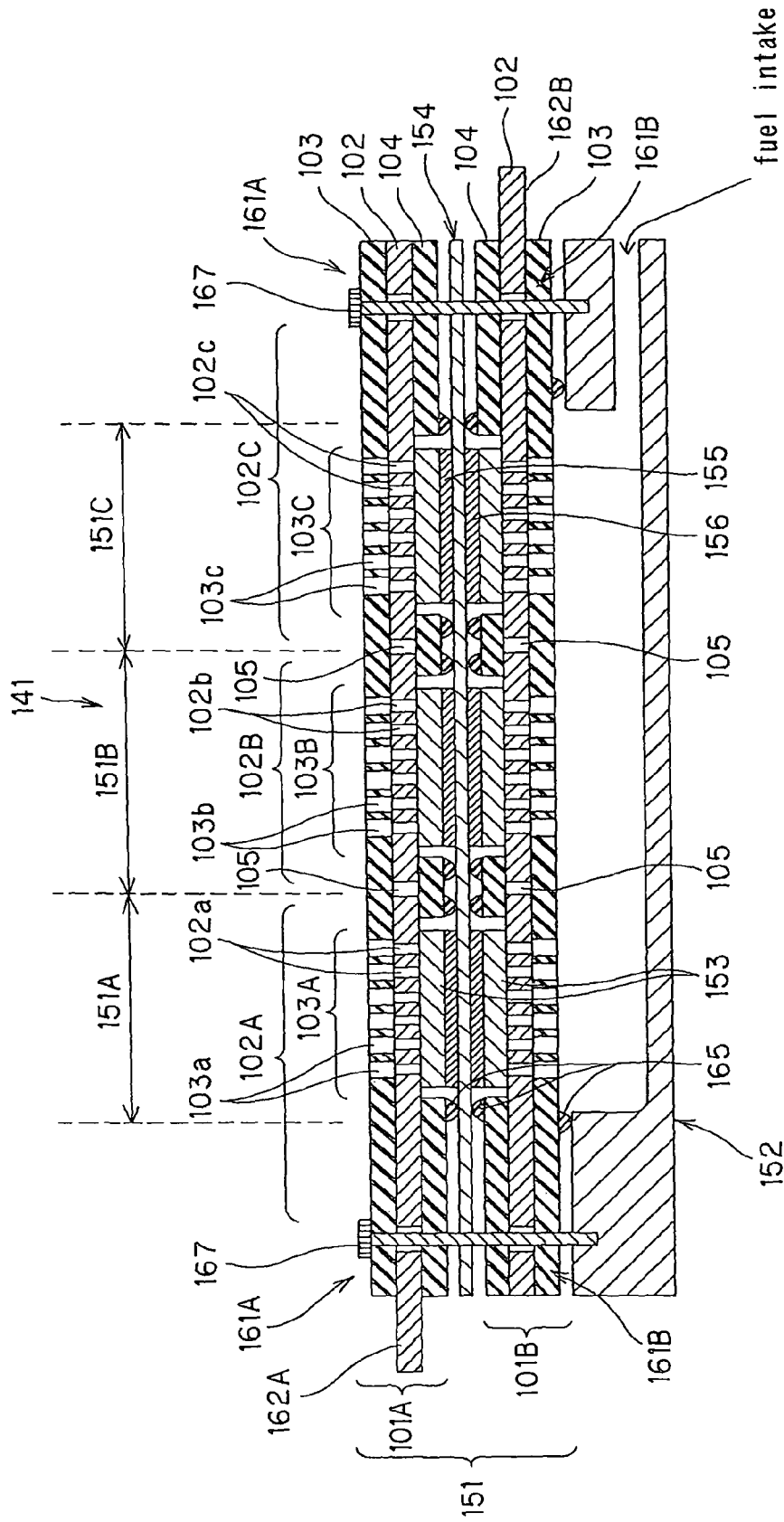
FIG. 14 is illustrative in construction of one example of a flat-type polymer electrolyte fuel cell using the separator of the invention.
Figure 15:
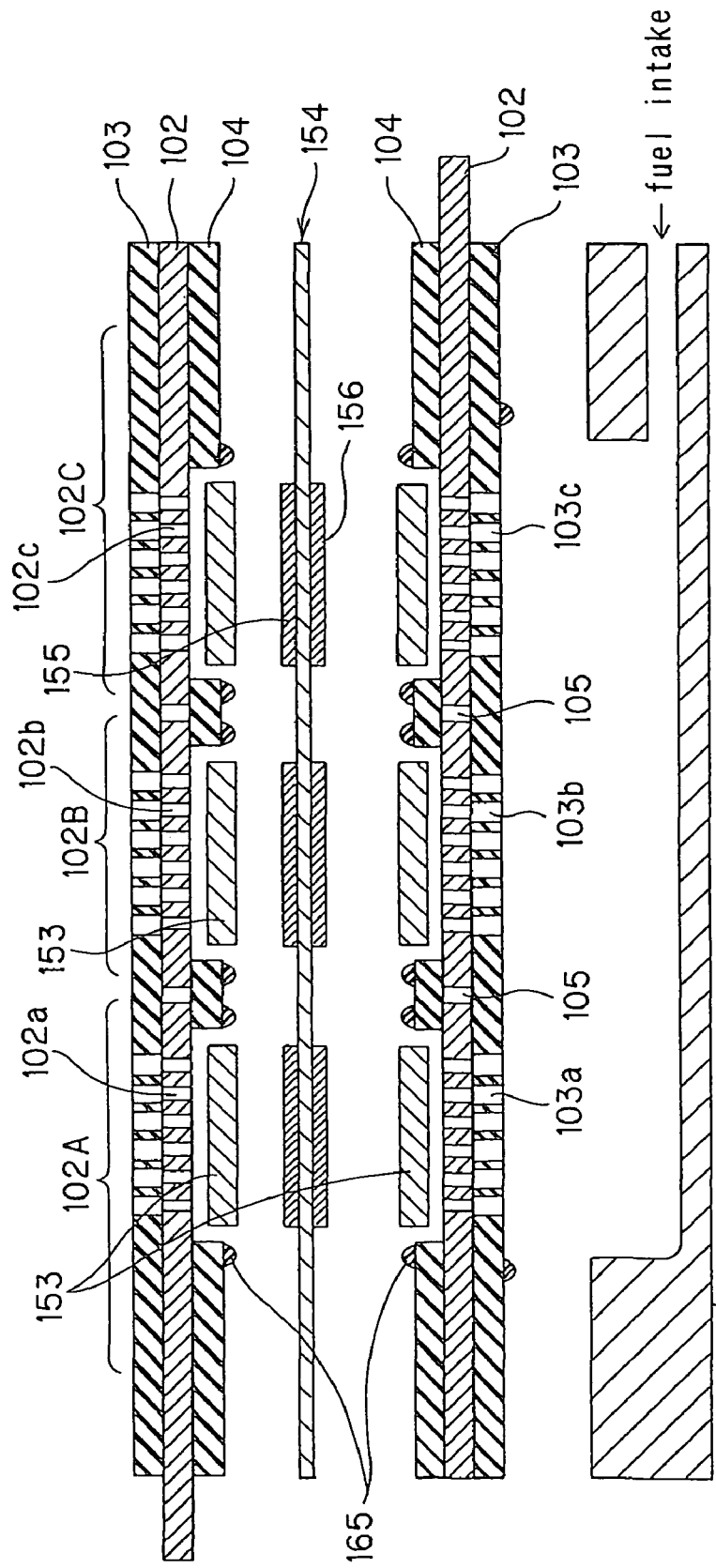
FIG. 15 is illustrative of the components, as taken apart, of the flat-type polymer electrolyte fuel cell depicted in FIG. 13.

FIG. 14 is illustrative in construction of an example of the flat-type polymer electrolyte fuel cell in which the above separator 101 of the invention is incorporated as the fuel-feed-side separator, and as the oxygen-feed-side separator, and FIG. 15 is illustrative, as taken apart, of the components of the flat-type polymer electrolyte fuel cell depicted in FIG. 13.

In FIGS. 14 and 15, a polymer electrolyte fuel cell 141 comprises a cell body 151 in which a membrane-electrode assembly (MEA) 154 is held between one set of separators 101A and 101B according to the invention, and a casing 152.

In the cell body 151, the respective membrane-electrode assembly (MEA) side frames 104 of the oxygen-feed-side separator 101A and the fuel-feed-side separator 101B are positioned opposite to the membrane-electrode assembly (MEA) 154, and the collector portions 102 of the respective separators 101A and 101B abut against the membrane-electrode assembly (MEA) 154 via carbon papers 153. The membrane-electrode assembly (MEA) 154 comprises an oxygen-electrode-side catalytic layer 155 on the side of the oxygen-feed-side separator 101A, and a fuel-electrode-side catalytic layer 156 on the side of the fuel-feed-side separator 101B.

Thus, three unit conductive cells 151A, 151B and 151C are arrayed in flat configuration. In this conjunction, no particular limitation is placed on electrical connections to the collector portion 102 (unit conductive substrates 102A, 102B and 102C) between the three unit cells 151A, 151B and 151C. For instance, on the side of the cell body 151, conductive members such as wires could be used to make electrical connections between the unit conductive substrates in the adjoining cells. Alternatively, connecting terminals connected to the respective unit conductive substrates 102A, 102B and 102C of the collector portion 102 could jut out of the separator 101 (the oxygen-feed-side separator 101A and the fuel-feed-side separator 101B), so that they could be used to make connections between the three unit cells 151A, 151B and 151C.

Furthermore in the above cell body 151, both ends of the membrane-electrode assembly (MEA) 154 are held between one set of outermost separator members 161A and 161B via sealing members 165. And then, fixing bolts 167 are used to fix the set of outermost separator members 161A and 161B with the cell body 151 held between them to the casing 152 via the sealing members 165.

The above outermost separator member 161A is constructed such that a conductive member 162A is held between it and an insulating member 163, and the outermost separator member 161B is constructed such that a conductive member 162B is held between it and the insulating member 163. And then, the conductive members 162A and 162B jut or protrude out of one ends of the fixing members 161A and 161B (on the left side of the drawings) in the form of electrode terminals.

Thus, the three unit cells 151A, 151B and 151C are electrically connected together in series, as schemed below.

Electrode Terminal 162A→*
*→Unit Cell 151A [Unit Conductive Substrate 102A of Separator 101A→Membrane-Electrode Assembly (MEA) 154→Unit Conductive Substrate 102A of Separator 101B]→*
*→Unit Cell 151B [Unit Conductive Substrate 102B of Separator 101A→Membrane-Electrode Assembly (MEA) 154→Unit Conductive Substrate 102B of Separator 101B]→*
*→Unit Cell 151C [Unit Conductive Substrate 102C of Separator 101A→Membrane-Electrode Assembly (MEA) 154→Unit Conductive Substrate 102C of Separator 101B]→*
*→Electrode Terminal 162B Such a polymer electrolyte fuel cell 141 can have an improved power generation capability with no or little contact resistance, because even when the membrane-electrode assembly (MEA) 154 swells, poor contact of the unit conductive substrates 102A, 102B and 102C with the membrane-electrode assembly (MEA) 154 is avoided by the oxygen-feed-side separator 101A and the fuel-feed-side separator 101B that are the separators of the invention.

Figure 16:
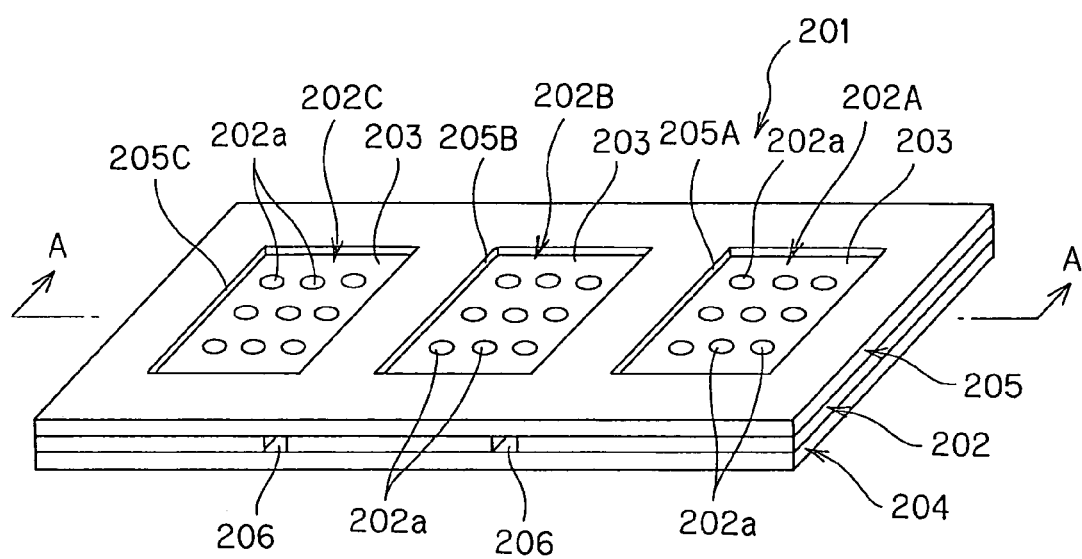
FIG. 16 is illustrative in perspective of one embodiment of the separator for a flat-type polymer electrolyte fuel cell according to the invention.
Figure 17:
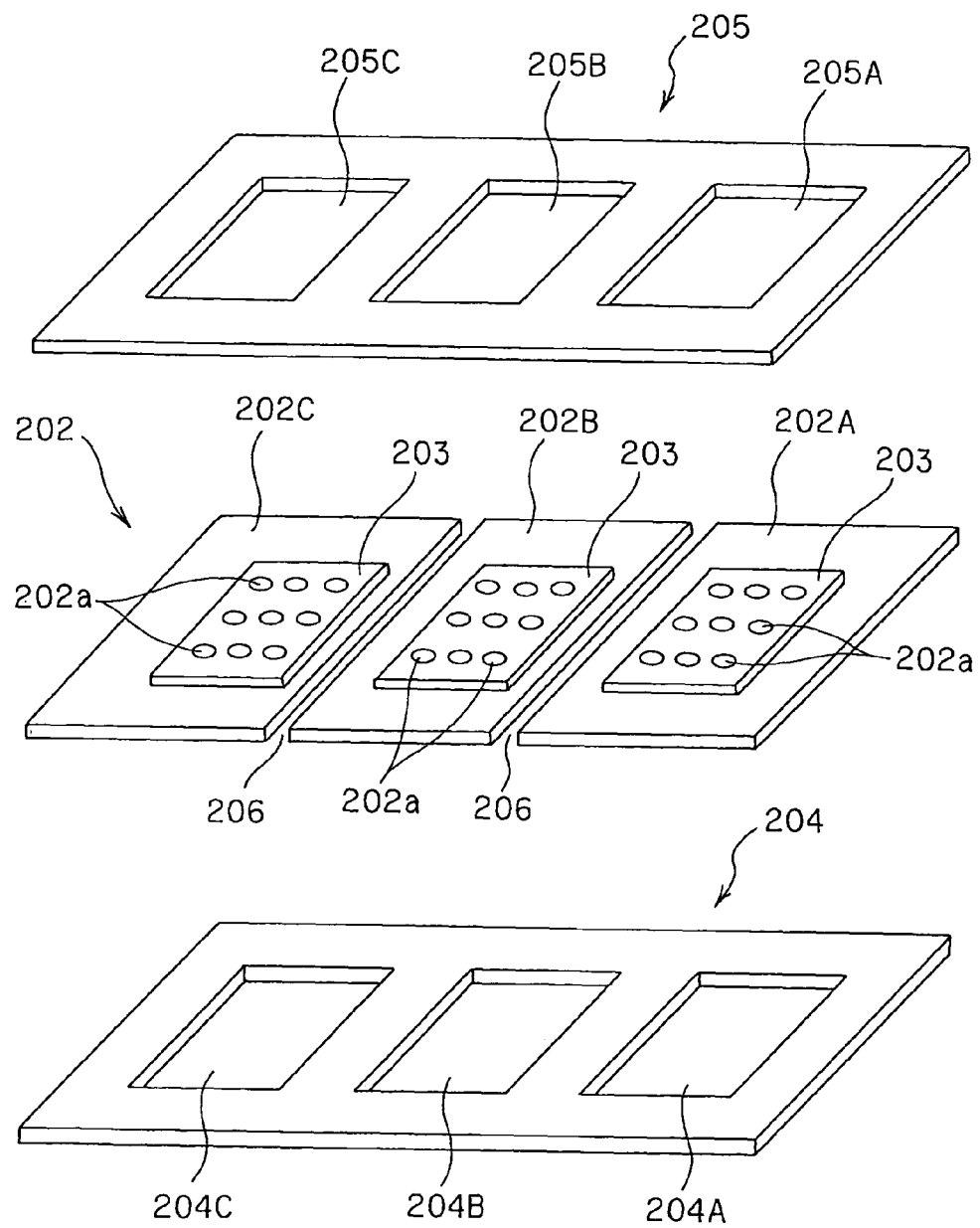
FIG. 17 is illustrative in perspective, as taken apart, of the collector portion, outer frame and membrane-electrode assembly (MEA) side frame that form the separator depicted in FIG. 16.
Figure 18:
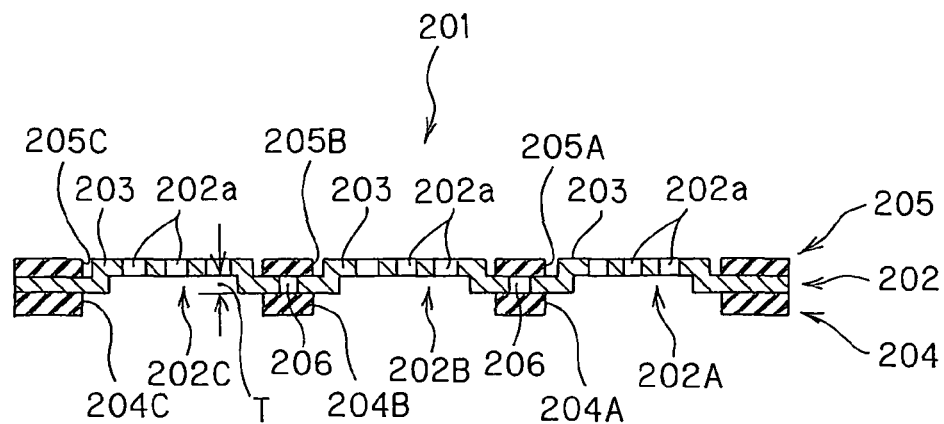
FIG. 18 is a sectional view of the separator depicted in FIG. 16, as taken on an A-A arrow section.

FIG. 16 is illustrative in perspective of one embodiment of the separator of the invention for a flat-type polymer electrolyte fuel cell; FIG. 17 is illustrative in perspective, as taken apart, of the collector portions, outer frame, and membrane-electrode assembly (MEA) side frame that form together the separator depicted in FIG. 16; and FIG. 18 is a sectional view of the separator depicted in FIG. 16, as taken on an A-A arrow section. In FIGS. 16-18, a separator 201 of the invention comprises an outer frame 204 and a membrane-electrode assembly (MEA) side frame 205, which are integrated in such a way as to hold a collector portion 202 between them.

In the collector portion 202 that forms a part of the separator 201, three rectangular unit conductive substrates 202A, 202B and 202C, each having a raised portion 203, are arrayed in flat configuration via gaps 206, and the raised portion 203 of each unit conductive substrate 202A, 202B, and 202C has a plurality of through-holes 202a. The raised portion 203 is offset with such area and size that it is well received in each opening 205A, 205B, and 205C in the membrane-electrode assembly (MEA) side frame 205 to be described later, with its surface being flat.

A conductive material used for such a collector portion 202 (unit conductive substrates 202A, 202B and 202C) should preferably be well conductive, ensure the desired strength, and be easy to process. For instance, stainless steel, cold-rolled steel sheet, aluminum, copper, and titanium could be used.

Also, the unit conductive substrates 202A, 202B and 202C should each preferably have at least on its side to abut against the membrane-electrode assembly (MEA) side frame 205 (the surface having the raised portion 203) a protective layer comprising a resin layer of corrosion resistance (acid resistance) and electrical conductivity. Such a protective layer, for instance, could be provided by a method wherein a resin mingled with carbon particles and a conductive material such as a corrosion-resistant metal is formed by electrochemical deposition into a film and that film is then heated and cured, or a method wherein a film comprising a conductive polymer resin containing an electrical conductive enhancement dopant is formed by electrolytic polymerization.

Alternatively, the unit conductive substrates could be each gilded or otherwise plated on its surface to have a corrosion-resistant metal layer without detrimental to electrical conductivity. Furthermore, such a corrosion-resistant metal layer could be provided on it with a protective layer having acid resistance and electrical conductivity.

The unit conductive substrates 202A, 202B and 202C, each having the raised portion 203, have been each configured into the given shape by machining such as extruding or pressing, or etching relying on photolithography, and the fuel or oxygen feed through-holes 202a have been provided by those techniques as well. The size (opening diameter) of each through-hole 202a is not critical; for instance, it could be properly selected from the range of 0.05 to 10 mm. Also, the amount of offset, T, (see FIG. 18) and planar shape of the raised portion 203 could be properly determined while taking into consideration the thickness and material of the unit conductive substrates 202A, 202B and 202C, the area, shape and number of the raised portion 203, and so on.

While, in the illustrative embodiment, nine through-holes 202a are provided in each unit conductive substrate 202A, 202B, and 202C, it is to be understood that no particular limitation is imposed on how many holes are provided, where they are located, and so on. It is also to be noted that each unit conductive substrate 202A, 202B and 202C could have a through-hole(s) 202a outside the raised portion 203, and such through-holes 202a could be properly located, considering the size, shape, or the like of the raised portion 203, and the openings 205A, 205B and 205C in the membrane-electrode assembly (MEA) side frame 205 to be described later. While, in the illustrated embodiment, the planar shape of the raised portions 203 offset with respect to the unit conductive substrates 202A, 202B and 202C is a rectangle, it is understood that other shapes such as round or oval shape could also be properly used.

The outer frame 204 that is integrated in such a way as to hold such a collector portion 202 in place comprises three openings 204A, 204B and 204C in alignment with the array position of the above unit conductive substrates 202A, 202B and 202C. At each opening 204A, 204B, and 204C, the through-holes 202a in each unit conductive substrate 202A, 202B, and 202C that forms a part of the collector portion 202 are exposed. The size and shape of the openings 204A, 204B and 204C that form a part of the outer frame 204 could be properly determined, considering the area, shape, or the like of the regions of the unit conductive substrates 202A, 202B and 202C of the collector portion 202, in which the through-holes 202a are provided.

The membrane-electrode assembly (MEA) side frame 205 that is integrated in such a way as to hold the collector portion 202 in place comprises three openings 205A, 205B and 205C in alignment with the array position of the above unit conductive substrates 202A, 202B and 202C. At the respective openings 205A, 205B and 205C, the raised portions 203 on the respective unit conductive substrates 202A, 202B and 202C that form a part of the collector portion 202 are positioned, with the through-holes 202a exposed. The size and shape of the openings 205A, 205B and 205C that form a part of the membrane-electrode assembly (MEA) side frame 205 could be properly determined depending on the shape, size, etc. of the raised portions 203 on the respective conductive substrates 202A, 202B and 202C of the collector portion 202.

The outer frame 204 and the membrane-electrode assembly (MEA) side frame 205 that form together the separator 201 should preferably be made of a material that is of insulating nature, easy to process, and of lightweight and high mechanical strength. Such materials, for instance, include substrate materials for printed wiring board substrates such as resins like polyimide, composite materials of resins like glass epoxy and inorganic materials, metals having an insulating coating on them, and ceramics. For such metals with insulating coatings, for instance, an Al-containing SUS material with an insulating coating formed on its surface by heat treatment, and an Al material with an insulating coating formed on its surface by anodizing could be used.

The outer frame 204 and the membrane-electrode assembly (MEA) side frame 205, each having such a desired shape as described above, could be formed by machining, laser processing, and so on. The outer frame 204 and the membrane-electrode assembly (MEA) side frame 205 could be identical with or different from each other in terms of thickness.

The unit conductive substrates 202A, 202B and 202C are arrayed via gaps 206 located between them, and held integrally between the outer frame 204 and the membrane-electrode assembly (MEA) side frame 205. In this regard, the gaps 206 could be filled up with an insulating material such as epoxy resin or fluororesin as an adhesive.

In such a separator 201 of the invention, the unit conductive substrates 202A, 202B and 202C having such structure as described above are configured in such a way as to jut or project toward the openings 205A, 205B and 205C in the membrane-electrode assembly (MEA) side frame 205. Therefore, even when the membrane-electrode assembly (MEA) swells in a flat-type polymer electrolyte fuel cell, the unit conductive substrates 202A, 202B and 202C work well against that swelling stress, thereby ensuring that the unit conductive substrates 202A, 202B and 202C are in reliable, sustained contact with the membrane-electrode assembly (MEA) and uniform contact pressure is obtainable all over the surface of each unit conductive substrate. It is thus possible to achieve a cell having limited contact resistance and, consequently, reduced internal resistance.

Figure 19:
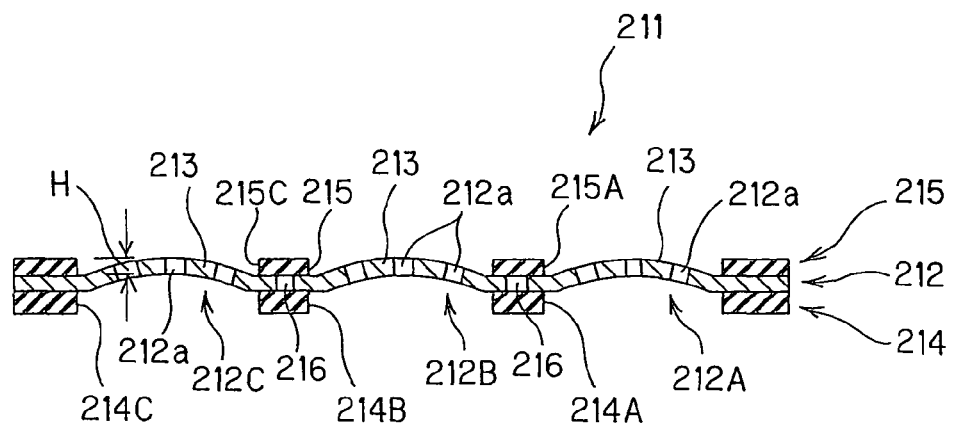
FIG. 19 is illustrative in section, as in FIG. 18, of yet another embodiment of the separator for a flat-type polymer electrolyte fuel cell according to the invention.

FIG. 19 is illustrative in section, as in FIG. 18, of another embodiment of the separator of the invention for a flat-type polymer electrolyte fuel cell. In FIG. 19, the separator 211 of the invention comprises an outer frame 214 and a membrane-electrode assembly (MEA) side frame 215 that are integrated in such a way as to hold a collector portion 212 between them.

As is the case with the above collector portion 202, a collector portion 212 that forms a part of the separator 211 comprises three rectangular unit conductive substrates 212A, 212B and 212C arrayed in flat configuration via gaps 216. The unit conductive substrates 212A, 212B and 212C have each a domed portion 213 with a plurality of through-holes 212a provided in it. Each domed portion 213 is domed in such a way as to be received in the opening 215A, 215B, and 215C in the membrane-electrode assembly (MEA) side frame 215 to be described later.

The conductive material used for such a collector portion 212 (unit conductive substrates 212A, 212B and 212C) could be the same as that for the above unit conductive substrates 202A, 202B and 202C. The collector portion 212 could have at least on the surface of its side abutting against the membrane-electrode assembly (MEA) side frame 215 a protective layer comprising a resin layer of corrosion resistance (acid resistance) and electrical conductivity. That protective layer could be formed, as is the case with the above unit conductive substrates 202A, 202B and 202C. Further, the unit conductive substrates 202A, 202B and 202C could be each gilded or otherwise plated on its surface to have a corrosion-resistant metal layer without detrimental to electrical conductivity. Furthermore, such a corrosion-resistant metal layer could be provided on it with a protective layer having acid resistance and electrical conductivity.

The unit conductive substrates 212A, 212B and 212C, each having the domed portion 213, have been each configured into the given shape by machining such as extruding or pressing, or etching relying on photolithography, and the fuel or oxygen feed through-holes 212a have been provided by those techniques as well. The size (opening diameter) of each through-hole 212a is not critical; for instance, it could be properly selected from the range of 0.05 to 10 mm. The dome height, H, of the domed portion (see FIG. 19) could be properly determined, considering the thickness and material of the unit conductive substrates 212A, 212B and 212C, the area, shape and number of the domed portions 213, and so on. Again, the dome shape of the domed portion 213 is not critical; for instance, it could be configured in catenary section form. Furthermore, a sweep surface obtained by sweeping a curved line like a part of cylindrical surface formed by sweeping an arc could be used; specifically, the above cylindrical surface or a sweep surface of catenary could be used.

While, in the illustrative embodiment, nine through-holes 212a are provided in each unit conductive substrate 212A, 212B, and 212C, it is to be understood that no particular limitation is imposed on how many holes are provided, where they are located, and so on. It is also to be noted that each unit conductive substrate 212A, 212B and 212C could have a through-hole(s) 212a (in a flat site) outside the domed portion 213, and such through-holes 212a could be properly located, considering the size, shape, or the like of the domed portion 213, and the openings 215A, 215B and 215C in the membrane-electrode assembly (MEA) side frame 215 to be described later.

The outer frame 214 and the membrane-electrode assembly (MEA) side frame 215 that are integrated in such a way as to hold the above collector portion 212 between them are similar to the outer frame 204 and the membrane-electrode assembly (MEA) side frame 205 in the above embodiment, each comprising three openings 214A, 214B, 214C and 215A, 215B, 215C in alignment with the array positions of the above respective unit conductive substrates 212A, 212B and 212C. At the respective openings 215A, 215B and 215C in the membrane-electrode assembly (MEA) side frame 215, the respective domed portions 213 of the respective conductive substrates 212A, 212B and 212C that form a part of the collector portion 212 are positioned, with the through-holes 212a exposed.

The outer frame 214 and the membrane-electrode assembly (MEA) side frame 215 could be formed of a material similar to that of the outer frame 204 and the membrane-electrode assembly (MEA) side frame 205. The outer frame 214 and the membrane-electrode assembly (MEA) side frame 215, each having such a desired shape as described above, could be formed by machining, laser processing, and so on. The outer frame 214 and the membrane-electrode assembly (MEA) side frame 215 could be identical with or different from each other in terms of thickness. The gaps 216, for instance, could be filled up with an insulating material such as epoxy resin or fluororesin as an adhesive.

In such a separator 211 of the invention, when the membrane-electrode assembly (MEA) swells in a flat-type polymer electrolyte fuel cell, such domed portions 213 as described above work well against that swelling stress, thereby ensuring that the unit conductive substrates 212A, 212B and 212C are in reliable, sustained contact with the membrane-electrode assembly (MEA) and uniform contact pressure is obtainable all over the surface of each unit conductive substrate. It is thus possible to achieve a cell having limited contact resistance and, consequently, reduced internal resistance.

The above separator of the invention is provided by way of example alone. For instance, the separator of the invention could comprise gas diffusion or catalytic layers in the openings 205A, 205B, 205C and 215A, 215B, 215C in the membrane-electrode assembly (MEA) side frames 205 and 215 in such a way as to cover up the unit conductive substrates 202A, 202B, 202C and 212A, 212B, 212C in the collector portions 202 and 212 on condition that they are not detrimental to the function of the above raised, and domed portions 203 and 213.

The above gas diffusion layer comprises a porous collector material, and could be made of carbon fibers, alumina, and so on. The thickness of the gas diffusion layer could be properly selected from the range of, for instance, about 20 to 500 μm.

In this regard, the catalytic layer works as a fuel electrode when the separator is used as the fuel-feed-side separator, and as an oxygen electrode when it is used as the oxygen-feed-side separator. Such catalytic layers, for instance, are formed of platinum, gold, palladium, ruthenium, copper, platinum oxides, tungsten oxides, iron, nickel and rhodium which could be used alone or in combinations of two or more. Catalytic layer thickness could be properly selected from the range of, for instance, about 10 to 300 μm.

One example of the flat-type polymer electrolyte fuel cell incorporating the separator of the invention is now explained.

Figure 20:
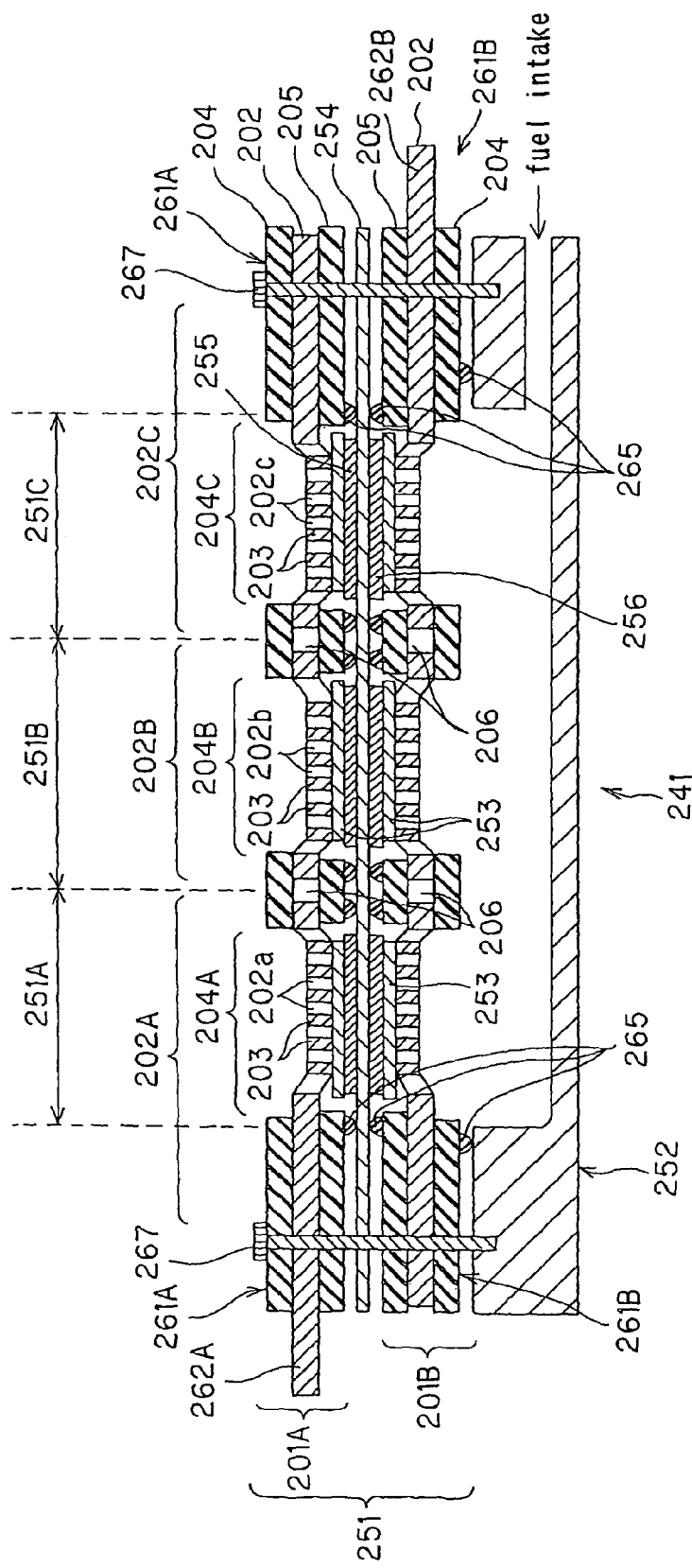
FIG. 20 is illustrative in construction of one example of a flat-type polymer electrolyte fuel cell using the separator of the invention.
Figure 21:
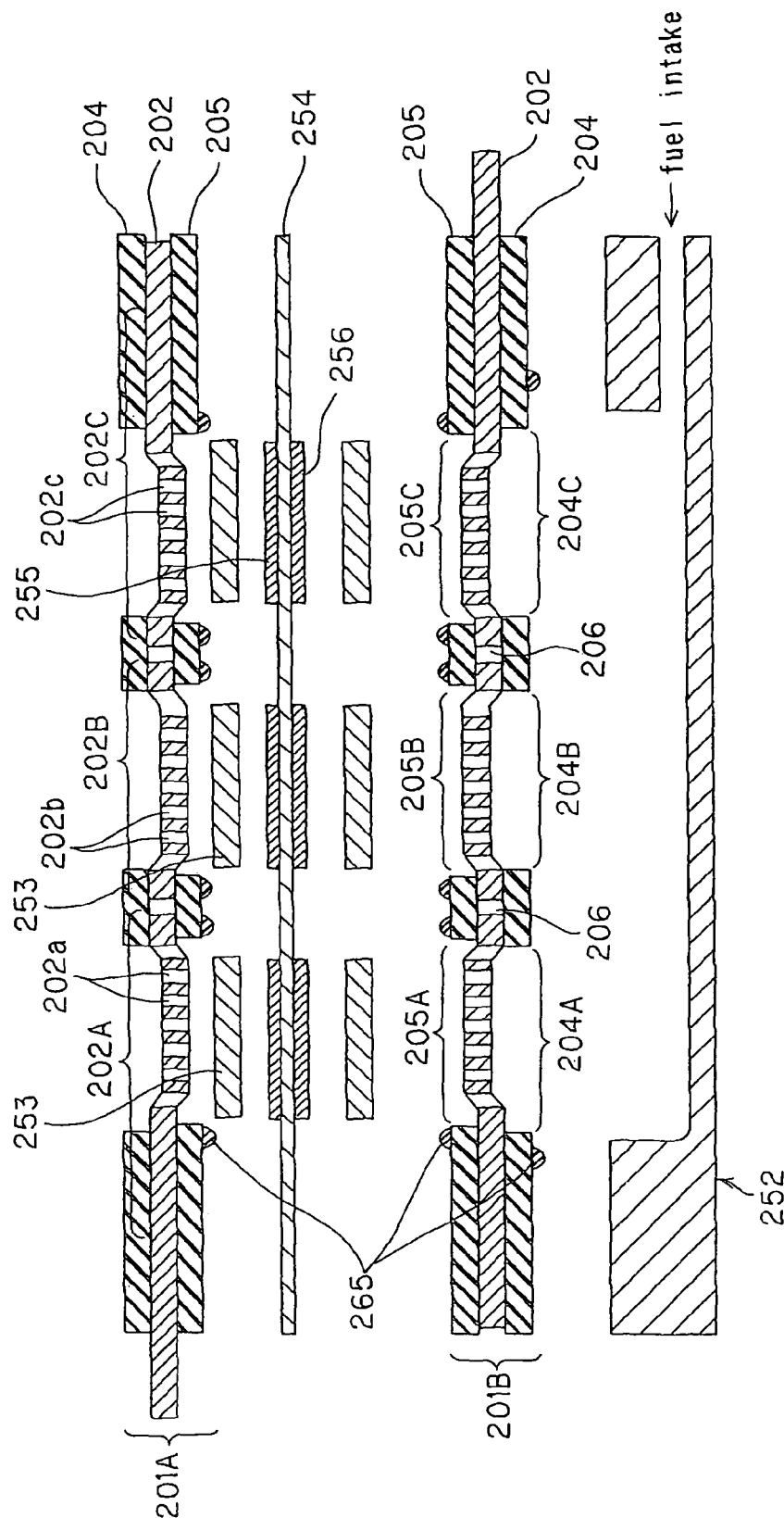
FIG. 21 is illustrative of the components, as taken apart, of the flat-type polymer electrolyte fuel cell depicted in FIG. 20.

FIG. 20 is illustrative in construction of an example of the flat-type polymer electrolyte fuel cell in which the above separator 201 of the invention is incorporated as the fuel-feed-side separator, and as the oxygen-feed-side separator, and FIG. 21 is illustrative, as taken apart, of the components of the flat-type polymer electrolyte fuel cell depicted in FIG. 20.

In FIGS. 20 and 21, a polymer electrolyte fuel cell 241 comprises a cell body 251 in which a membrane-electrode assembly (MEA) 254 is held between one set of separators 201A and 201B according to the invention, and a casing 252.

In the cell body 251, the respective membrane-electrode assembly (MEA) side frames 205 of the oxygen-feed-side separator 201A and the fuel-feed-side separator 201B are positioned opposite to the membrane-electrode assembly (MEA) 254, and the collector portions 202 of the respective separators 201A and 201B abut against the membrane-electrode assembly (MEA) 254 via carbon papers 253. The membrane-electrode assembly (MEA) 254 comprises an oxygen-electrode-side catalytic layer 255 on the side of the oxygen-feed-side separator 201A, and a fuel-electrode-side catalytic layer 256 on the side of the fuel-feed-side separator 201B.

Thus, three unit conductive cells 251A, 251B and 251C are arrayed in flat configuration. In this conjunction, no particular limitation is placed on electrical connections to the collector portion 202 (unit conductive substrates 202A, 202B and 202C) between the three unit cells 251A, 251B and 251C. For instance, on the side of the cell body 251, conductive members such as wires could be used to make electrical connections between the unit conductive substrates in the adjoining cells. Alternatively, connecting terminals connected to the respective unit conductive substrates 202A, 202B and 202C of the collector portion 202 could jut out of the separator 201 (the oxygen-feed-side separator 201A and the fuel-feed-side separator 201B), so that they could be used to make connections between the three unit cells 251A, 251B and 251C.

Furthermore in the above cell body 251, both ends of the membrane-electrode assembly (MEA) 254 are held between one set of outermost separator members 261A and 261B via sealing members 265. And then, fixing bolts 267 are used to fix the set of outermost separator frame members 261A and 261B with the cell body 251 held between them to the casing 252 via the sealing members 265.

The above outermost separator member 261A is constructed such that a unit conductive substrate 202A of the collector portion 202 is held between the outer frame 204 and the membrane-electrode assembly (MEA) side frame 205. And, the above outermost separator member 261B is constructed such that a unit conductive substrate 202C of the collector portion 202 is held between the outer frame 204 and the membrane-electrode assembly (MEA) side frame 205. And then, electrode terminals 262A and 262B connected to the collector portion 202 protrude out of one ends of the outermost separator frame members 261A and 261B (on the right side of the drawings).

Thus, the three unit cells 251A, 251B and 251C are electrically connected together in series, as schemed below.
Electrode Terminal 262A→*
*→Unit Cell 251A [Unit Conductive Substrate 202A of Separator 201A→Membrane-Electrode Assembly (MEA) 254→Unit Conductive Substrate 202A of Separator 201B]→*
*→Unit Cell 251B [Unit Conductive Substrate 202B of Separator 201A→Membrane-Electrode Assembly (MEA) 254→Unit Conductive Substrate 202B of Separator 201B]→*
*→Unit Cell 251C [Unit Conductive Substrate 202C of Separator 201A→Membrane-Electrode Assembly (MEA) 254→Unit Conductive Substrate 202C of Separator 201B]→*
*→Electrode Terminal 262B Such a polymer electrolyte fuel cell 241 can have a much improved power generation capability with no or little contact resistance, because even when the membrane-electrode assembly (MEA) 254 swells, poor contact of the unit conductive substrates 202A, 202B and 202C with the membrane-electrode assembly (MEA) 254 is avoided by the oxygen-feed-side separator 201A and the fuel-feed-side separator 201B that are the separators of the invention.

Figure 22:
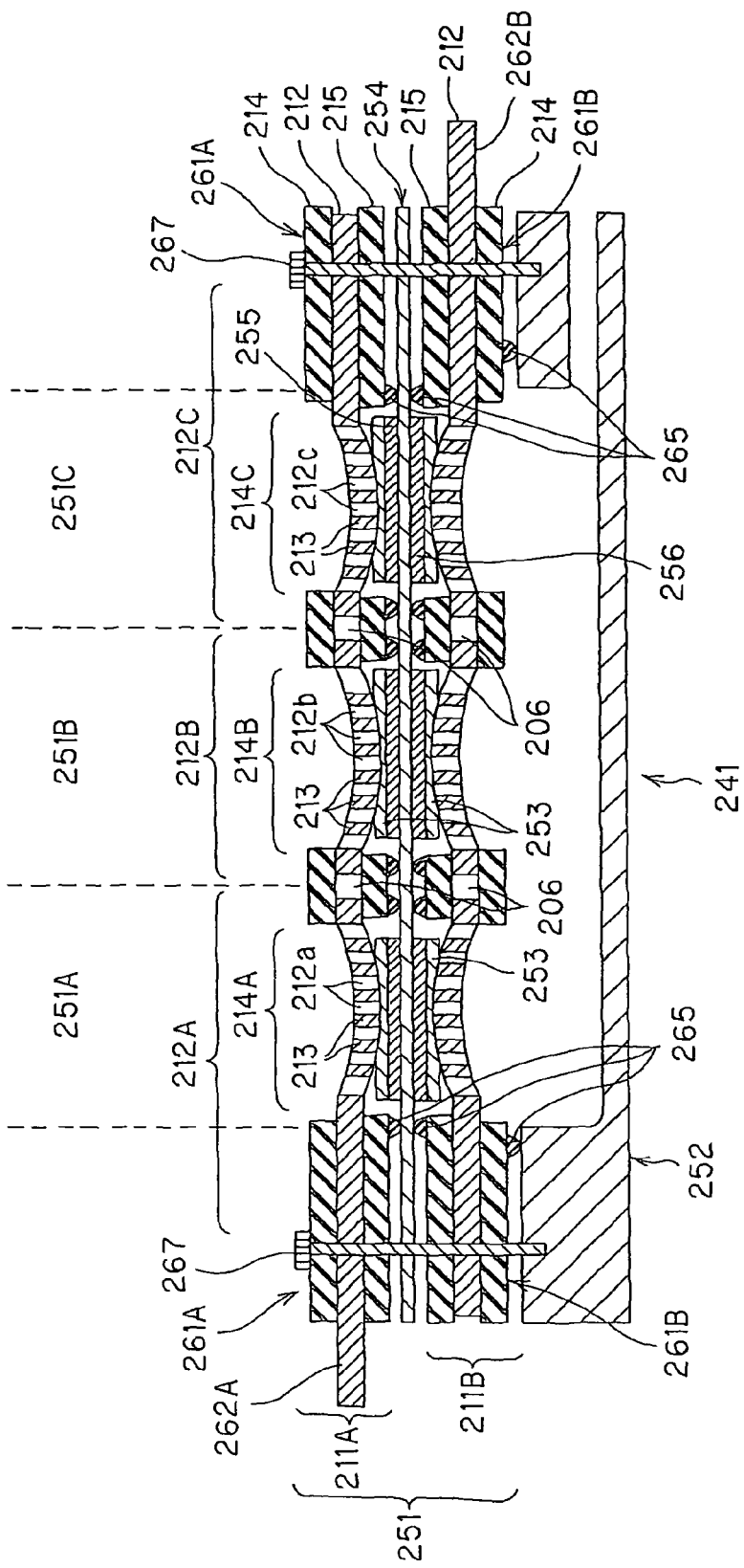
FIG. 22 is illustrative in construction of another example of the flat-type polymer electrolyte fuel cell using the separator of the invention.
Figure 23:
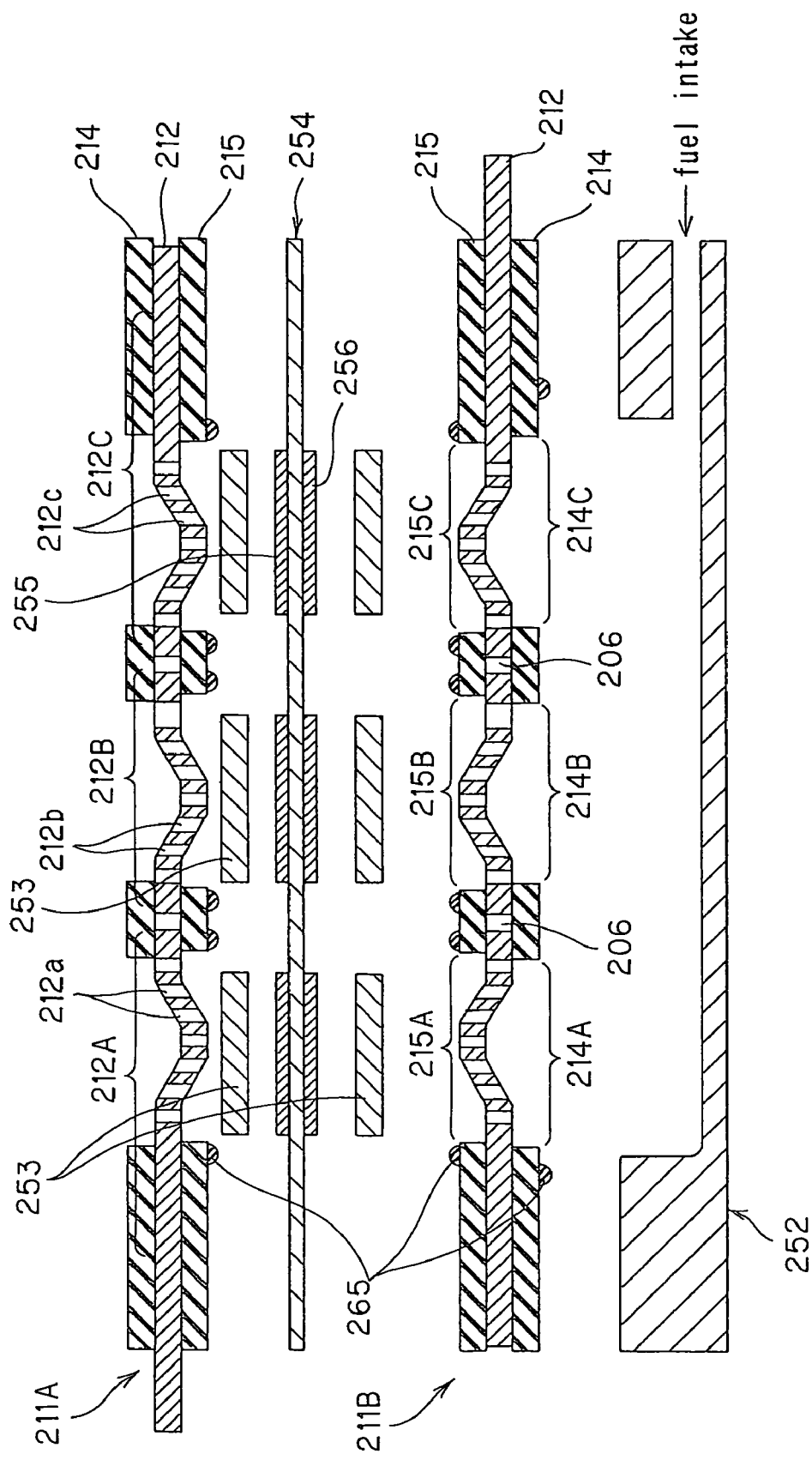
FIG. 23 is illustrative of the components, as taken apart, of the flat-type polymer electrolyte fuel cell depicted in FIG. 22.

FIG. 22 is illustrative in construction of one example of the flat-type polymer electrolyte fuel cell in which, instead of the above separators 201 of the invention, the separators 211 of the invention are incorporated as a fuel-feed-side separator and an oxygen-feed-side separator, and FIG. 23 is illustrative, as taken apart, of the components of the flat-type polymer electrolyte fuel cell depicted in FIG. 22. In FIGS. 22 and 23, it is noted that the components other than the separators are common to those in the polymer electrolyte fuel cell 241 depicted in FIGS. 20 and 21, and are indicated by similar reference numerals as in FIGS. 20 and 21.

The polymer electrolyte fuel cell 241 depicted in FIGS. 22 and 23, too, can have an improved power generation capability with no or little contact resistance, because when the membrane-electrode assembly (MEA) 254 swells, poor contact of the unit conductive substrates 212A, 212B and 212C with the membrane-electrode assembly (MEA) 254 is avoided by the oxygen-feed-side separator 211A and the fuel-feed-side separator 211B that are the separators of the invention.

POSSIBLE INDUSTRIAL APPLICATIONS

The separator of the invention can be used with a flat-type polymer electrolyte fuel cell, and achieve a lightweight, slimmed-down direct methanol type fuel cell.

What we claim is:
1. A flat-type polymer electrolyte fuel cell including unit cells arrayed in a flat configuration, the flat-type polymer electrolyte fuel cell comprising:
a fuel-feed-side separator; and
an oxygen-feed-side separator,
each of the fuel-feed-side separator and oxygen-feed-side separator comprise:
a collector portion including n unit conductive substrates wherein n is an integer of 2 or more, each conductive substrate having a plurality of through-holes through which fuel or oxygen passes, the conductive substrates are arrayed in a flat configuration via gaps,
and a pair of insulating frames which have n openings in alignment with an array position of said unit conductive substrates and are integrated in such a way as to hold the collector portion therebetween, wherein
$1^{st}$ to $(n-1)^{th}$ unit conductive substrates of the n unit conductive substrates that form the collector portion in one of the fuel-feed-side separator or the oxygen-feed-side separator, as counted from an end of an array direction thereof, and $2^{nd}$ to $n^{th}$ unit conductive substrates of the n unit conductive substrates that form the collector portion in another of the fuel-feed-side separator or the oxygen-feed-side separator, as counted from the end of the array direction thereof are successively joined together by) n−1) connecting hinges;
wherein the conductive substrates of the fuel-feed-side separator and the oxygen-feed-side separator and the (n−1) connecting hinges are the same material.
2. The flat-type polymer electrolyte fuel cell according to claim 1, wherein:
in one of the fuel-feed-side separator and the oxygen-feed-side separator, the $1^{st}$ to $(n-1)^{th}$ unit conductive substrates of the n unit conductive substrates that form the collector portion, as counted from the end of the array direction, each includes, at a corner, a lug member that juts toward an adjoining unit conductive substrate,
the $2^{nd}$ to $n^{th}$ unit conductive substrates as counted from the end of the array direction each includes, at a corner, a cutout that is in alignment with the lug member of a unit conductive substrate adjacent to an upstream side of the array direction and configured to from a gap with the lug member,
the (n−1) unit conductive substrates having the lug members each includes, at the lug member, a connecting hinge that juts in a direction substantially orthogonal to the array direction of the unit conductive substrates, and the $2^{nd}$ to $n^{th}$ unit conductive substrates of the n unit conductive substrates that form the collector portion in another separator, as counted from one end of the array direction thereof, are joined to the lug members by means of the (n−1) connecting hinges.

3. The flat-type polymer electrolyte fuel cell according to claim 1, further comprising:

electrode terminals provided at the n unit conductive substrates that form the collector portions in the fuel-feed-side separator and the oxygen-feed-side separator which are positioned at ends of the respective array directions and to which the connecting hinges are not connected.

4. The flat-type polymer electrolyte fuel cell according to claim 1, wherein the conductive substrates of the fuel-feed-side separator and the oxygen-feed-side separator and the (n−1) connecting hinges are fabricated by a process wherein the fuel-feed-side separator and the oxygen-feed-side separator are joined together via the (n−1) connecting hinges.

* * * * *